US012672040B2

(12) United States Patent
Jung

(10) Patent No.: US 12,672,040 B2
(45) Date of Patent: Jun. 30, 2026

(54) METHOD AND APPARATUS FOR RESELECTING CELL BASED ON SLICE INFORMATION IN WIRELESS COMMUNICATION SYSTEM

(71) Applicant: Samsung Electronics Co., Ltd., Gyeonggi-do (KR)

(72) Inventor: Sangyeob Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 18/348,832

(22) Filed: Jul. 7, 2023

(65) Prior Publication Data

US 2024/0015621 A1     Jan. 11, 2024

(30) Foreign Application Priority Data

Jul. 7, 2022     (KR) ........................ 10-2022-0083912

(51) Int. Cl.
H04W 36/08          (2009.01)
H04W 76/30          (2018.01)

(52) U.S. Cl.
CPC ........... H04W 36/08 (2013.01); H04W 76/30 (2018.02)

(58) Field of Classification Search
CPC .............................. H04W 36/08; H04W 76/30
See application file for complete search history.

(56) References Cited

U.S. PATENT DOCUMENTS

2022/0303884 A1*  9/2022  Chen ..................... H04W 76/00
2025/0254579 A1*  8/2025  Ramachandra ....... H04W 24/10

* cited by examiner

*Primary Examiner* — Justin Y Lee
(74) *Attorney, Agent, or Firm* — The Farrell Law Firm, P.C.

(57)          ABSTRACT

The disclosure relates to a fifth generation (5G) or sixth generation (6G) communication system for supporting a higher data transmission rate and provides a method performed by a user equipment (UE) in a wireless communication system. The method includes identifying a measurement capability of the UE for a cell reselection, and receiving, from a base station, a radio resource control (RRC) release message including configuration information related to cell reselection priorities based on the measurement capability of the UE. The configuration information related to the cell reselection priorities comprises a freqPriorityListNR list and a freqPriorityListDedicatedSlicing list.

16 Claims, 13 Drawing Sheets

METHOD AND APPARATUS FOR RESELECTING CELL BASED ON SLICE INFORMATION IN WIRELESS COMMUNICATION SYSTEM

CROSS-REFERENCE TO RELATED APPLICATION

This application is based on and claims priority under 35 U.S.C. § 119 to Korean Patent Application No. 10-2022-0083912, which was filed in the Korean Intellectual Property Office on Jul. 7, 2022, the entire disclosure of which is incorporated herein by reference.

BACKGROUND

1. Field

The disclosure relates generally to wireless communication, and more particularly, to a method and apparatus for reselecting a cell, based on slice information, in a wireless communication system.

2. Description of the Related Art $5^{th}$ generation (5G) mobile communication technologies define a wide frequency band for enabling a fast data rate and a new service, and can be implemented in a frequency band of a sub 6 gigahertz (GHz) band such as 3.5 GHz and also implemented in an ultra-high frequency band (millimeter wave (mmWave)) of an above 6 GHz band such as 28 GHz or 39 GHz. In a case of $6^{th}$ generation (6G) mobile communication technology referred to as a beyond-5G system, in order to achieve a data rate that is 50 times as fast as 5G mobile communication technologies and $\frac{1}{10}$ the radio latency thereof, it has been considered to implement 6G mobile communication technologies in a terahertz (THz) band, such as 95 GHz to 3 THz bands.

Since the early stage of the development of 5G mobile communication technologies, in order to support services and fulfill performance requirements in association with enhanced mobile broadband (eMBB), ultra reliable low latency communications (URLLC), and massive machine-type communications (mMTC), there has been ongoing standardization regarding beamforming and massive multiple input multiple output (MIMO) for decreasing path loss of radio waves and increasing transmission distances of radio waves in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions about improvement and performance enhancement of initial 5G mobile communication technologies in view of services to be supported by 5G mobile communication technologies, and there has been physical layer standardization about technologies such as vehicle-to-everything (V2X) for aiding driving determination by autonomous vehicles based on information about positions and states of vehicles transmitted by the vehicles and for enhancing user convenience, new radio unlicensed (NR-U) aimed at system operations conforming to various regulation-associated requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services via interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access channel procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

When such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), or the like, 5G performance improvement and complexity reduction by utilizing artificial intelligence (AI) and machine learning (ML), AI service support, metaverse service support, drone communication, etc.

Such development of 5G mobile communication systems will serve as a base for developing new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

However, the conventional art is deficient as to cell reselection. Therefore, there is a need in the art for a method and apparatus for reselecting a cell, based on slice information.

SUMMARY

The disclosure has been made to address at least the above-mentioned problems and/or disadvantages and to provide at least the advantages described below.

Accordingly, an aspect of the disclosure is to provide a method and apparatus for reselecting a cell, based on slice information, in a wireless communication system.

Another aspect of the disclosure is to provide . . . .

In accordance with an aspect of the disclosure, a method performed by a UE in a wireless communication system is provided. The method includes identifying a measurement capability of the UE for a cell reselection, and receiving, from a base station, an RRC release message including configuration information related to cell reselection priorities based on the measurement capability of the UE. The configuration information related to the cell reselection priorities comprises a freqPriorityListNR list and a freqPriorityListDedicatedSlicing list.

In accordance with an aspect of the disclosure, a method performed by a base station in a wireless communication system is provided. The method comprises receiving information related to a measurement capability of the UE for a cell reselection. The method comprises transmitting, to the UE, an RRC release message including configuration information related to cell reselection priorities based on the measurement capability of the UE. And the configuration information related to the cell reselection priorities comprises a freqPriorityListNR list and a freqPriorityListDedicatedSlicing list.

In accordance with an aspect of the disclosure, a UE of a wireless communication system comprising a transceiver and at least one processor is provided. The at least one processor is configured to identify a measurement capability of the UE for a cell reselection, and receive from a base station, an RRC release message including configuration information related to cell reselection priorities based on the measurement capability of the UE. The configuration information related to the cell reselection priorities comprises a freqPriorityListNR list and a freqPriorityListDedicatedSlicing list.

In accordance with an aspect of the disclosure, a base station of a wireless communication system comprising a transceiver and at least one processor is provided. The at least one processor is configured to receive information related to a measurement capability of the UE for a cell reselection, and transmit, to the UE, an RRC release message including configuration information related to cell reselection priorities based on the measurement capability of the UE. The configuration information related to the cell reselection priorities comprises a freqPriorityListNR list and a freqPriorityListDedicatedSlicing list.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described in detail with reference to accompanying drawings. In the following descriptions, well-known functions or configurations are not described in detail for the sake of clarity and conciseness. The terms used in the specification are defined in consideration of functions used in the disclosure and can be changed according to the intent or commonly used methods of users or operators. Accordingly, definitions of the terms are understood based on the entire description of the present specification.

Elements included in the disclosure are expressed in a singular or plural form that is appropriately selected for convenience of description and the disclosure is not limited thereto. As such, an element expressed in a plural form may also be configured as a single element, and an element expressed in a singular form may also be configured as plural elements.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Hereinafter, terms identifying an access node and terms indicating network entities, messages, an interface between network entities, and various pieces of identification information, are used for convenience of description. Accordingly, the disclosure is not limited to the terms to be described below, and other terms indicating objects having the same technical meanings may be used.

Terms and names defined in the 3$^{rd}$ Generation Partnership Project (3GPP) LTE are used in the disclosure. However, the disclosure is not limited to these terms and names and may be equally applied to systems conforming to other standards. In the disclosure, an evolved node B (eNB) may be interchangeably used with a next-generation node B (gNB) for convenience of description. That is, a BS described by an eNB may represent a gNB.

Figure 1A:
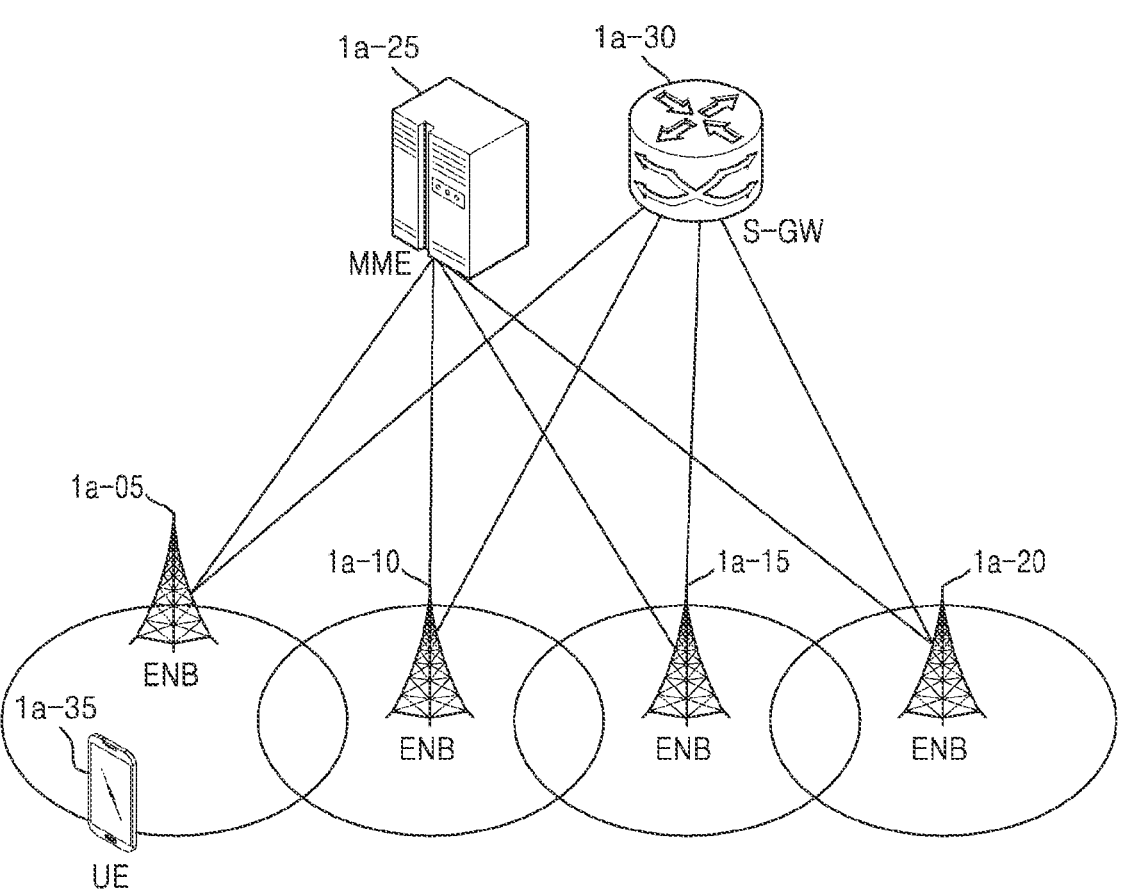
FIG. 1A illustrates a long term evolution (LTE) system, according to an embodiment.

Definitions of parameters used herein may be found in the 3GPP standard specification of TS 38.304. FIG. 1A illustrates an LTE system according to an embodiment.

Referring to FIG. 1A, a radio access network (RAN) of the LTE system may include a plurality of next-generation BSs (e.g., eNBs, nodes B, or BSs) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30

In FIG. 1A, the eNB 1a-05, 1a-10, 1a-15, or 1a-20 may correspond to a legacy node B of a universal mobile telecommunications system (UMTS), may be connected to the UE 1a-35 via wireless channels and may perform more complex functions than the legacy node B. In the LTE system, all user traffic data including real-time services such as voice over Internet protocol (VoIP) may be serviced via shared channels, and therefore, an entity for performing scheduling by collating status information of UEs, the state information including buffer state information, available transmit power state information, and channel state information, may be required and the eNB 1a-05, 1a-10, 1a-15, or 1a-20 may operate as such an entity. One eNB may generally control a plurality of cells. For example, the LTE system may use radio access technology (RAT) such as orthogonal frequency division multiplexing (OFDM) at a bandwidth of 20 megahertz (MHz) so as to achieve a data rate of 100 megabits per second (Mbps). The LTE system may use adaptive modulation & coding (AMC) to determine a modulation scheme and a channel coding rate in accordance with a channel state of the UE 1a-35. The S-GW 1a-30 may provide and establish or release data bearers according to the control by the MME 1a-25. The MME 1a-25 may perform a mobility management function and various control functions on the UE 1a-35 and may be connected to the plurality of eNBs 1a-05, 1a-10, 1a-15, and 1a-20.

Figure 1B:
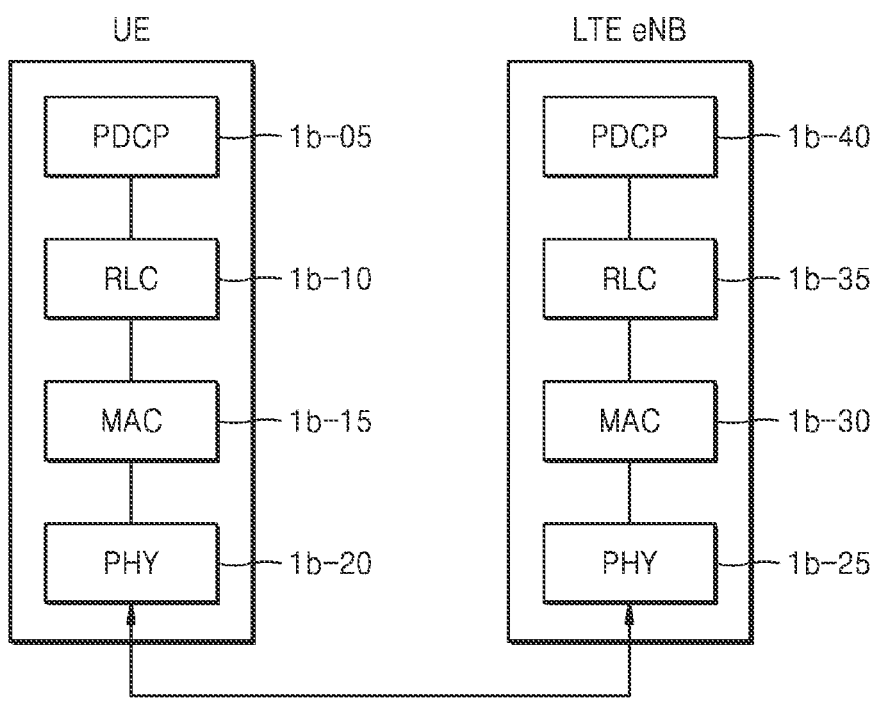
FIG. 1B illustrates a radio protocol architecture of an LTE system, according to an embodiment.

FIG. 1B illustrates a radio protocol architecture of an LTE system according to an embodiment.

Referring to FIG. 1B, the radio protocol architecture of the LTE system includes packet data convergence protocol (PDCP) layers 1b-05 and 1b-40, radio link control (RLC) layers 1b-10 and 1b-35, media access control (MAC) layers 1b-15 and 1b-30, and physical (PHY) layers 1b-20 and 1b-25 respectively for a UE and a LTE eNB. The PDCP layer 1b-05 or 1b-40 is in charge of Internet protocol (IP) header compression/decompression. Main functions of the PDCP layer 1b-05 or 1b-40 are as follows.

Header compression and decompression: robust header compression (ROHC) only

Transfer of user data

In-sequence delivery of upper layer packet data units (PDUs) at a PDCP re-establishment procedure for RLC acknowledged mode (AM)

For split bearers in dual connectivity (DC) (support only for RLC AM): PDCP PDU routing for transmission and PDCP PDU reordering for reception Duplicate detection of lower layer service data units (SDUs) at a PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in an uplink (UL)

The RLC layer 1b-10 or 1b-35 performs an automatic repeat request (ARQ) operation by reconfiguring PDCP PDUs to appropriate sizes. Main functions of the RLC layer 1b-10 or 1b-35 may be summarized as follows.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE and may multiplex RLC PDUs into a MAC PDU and demultiplex the RLC PDUs from the MAC PDU. Main functions of the MAC layer 1b-15 or 1b-30 are summarized as follows.

Mapping between logical channels and transport channels

Multiplexing/demultiplexing of MAC SDUs belonging to one or more logical channels into/from transport blocks (TBs) delivered to/from the physical layer on transport channels Scheduling information reporting Error correction through HARQ Priority handling between logical channels of one UE Priority handling between UEs by means of dynamic scheduling Multimedia broadcast/multicast service (MBMS) identification Transport format selection Padding The PHY layer 1b-20 or 1b-25 may channel-code and modulate upper layer data into OFDM symbols and transmit the OFDM symbols via a wireless channel or may demodulate OFDM symbols received via a wireless channel and channel-decode and deliver the OFDM symbols to an upper layer.

Figure 1C:
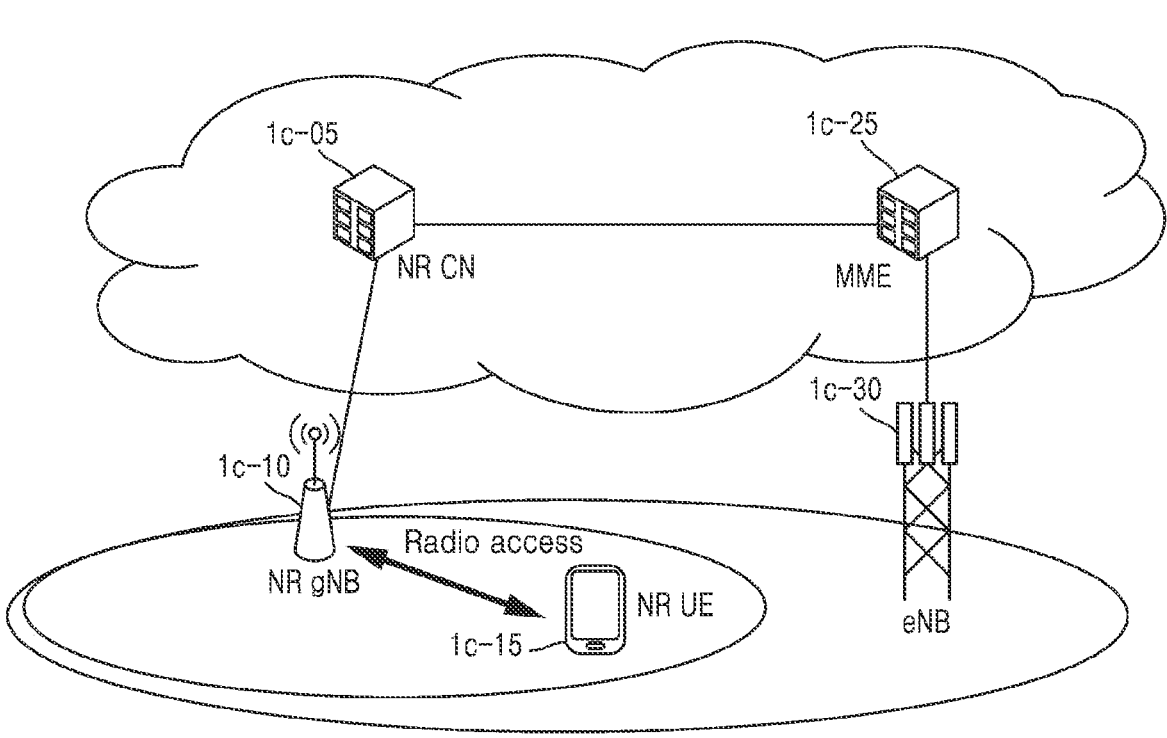
FIG. 1C illustrates a wireless communication system, according to an embodiment.

FIG. 1C illustrates a wireless communication system according to an embodiment.

Referring to FIG. 1C, a RAN of the wireless communication system (e.g., an NR or 5G system) may include a next-generation BS (an NR node B, e.g., NR gNB or NR BS) 1c-10 and an NR core network (NR CN) 1c-05. An NR UE (or NR terminal) 1c-15 may access an external network via the NR gNB 1c-10 and the NR CN 1c-05.

In FIG. 1C, the NR gNB 1c-10 corresponds to an eNB of a legacy LTE system. The NR gNB 1c-10 may be connected to the NR UE 1c-15 via wireless channels and may provide more services than a legacy node B. In the NR or 5G system, all user traffic data may be serviced via shared channels, and therefore, an entity for performing scheduling by collecting buffer state information of UEs, available transmit power state information, and channel state information may be required. The NR gNB 1c-10 may operate as such an entity and may control a plurality of cells. In the NR or 5G system, a bandwidth greater than the maximum bandwidth of the legacy LTE system may be applied to achieve an ultrahigh data rate, and a beamforming technology may be additionally associated with OFDM as a RAT. AMC may also be used to determine a modulation scheme and a channel coding rate in accordance with a channel state of the NR UE 1c-15. The NR CN 1c-05 may perform functions such as mobility support, bearer establishment, and quality of service (QoS) configuration. The NR CN 1c-05 performs a mobility management function and various control functions on the NR UE 1c-15 and may be connected to a plurality of BSs. The NR or 5G system may cooperate with the legacy LTE system, and the NR CN 1c-05 may be connected to an MME 1c-25 via a network interface. The MME 1c-25 may be connected to a legacy eNB 1c-30.

Figure 1D:
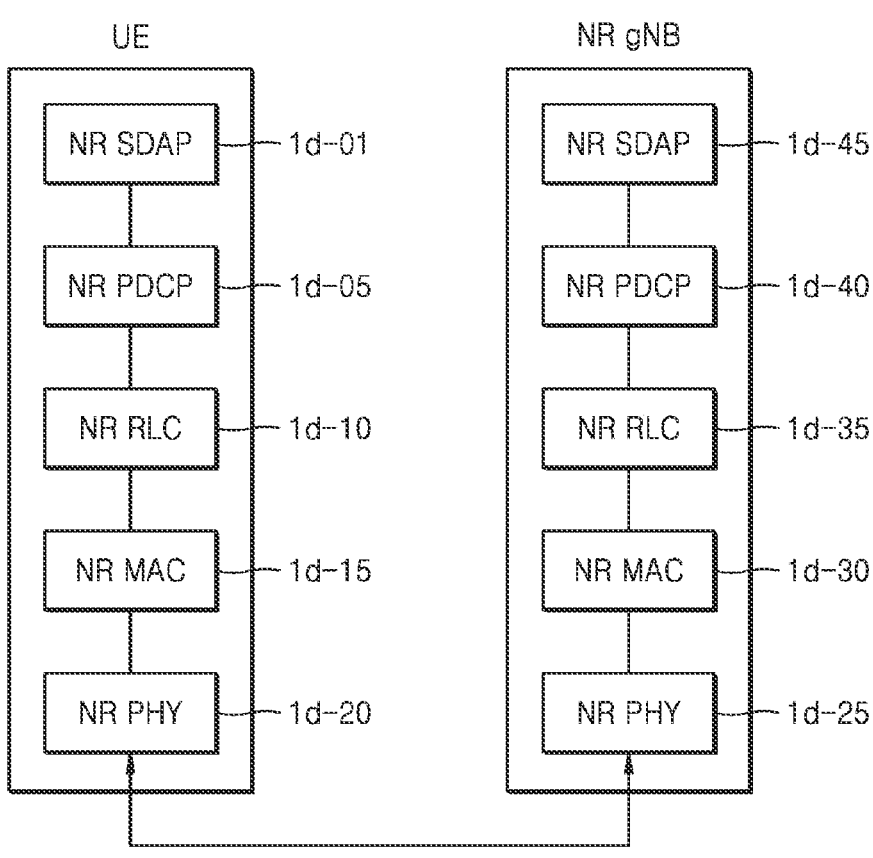
FIG. 1D illustrates a radio protocol architecture of a wireless communication system, according to an embodiment.

FIG. 1D illustrates a radio protocol architecture of a wireless communication system according to an embodiment.

Referring to FIG. 1D, the radio protocol architecture of the wireless communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and an NR gNB.

Functions of the NR SDAP layer 1d-01 or 1d-45 may include:

Transfer of user plane data

Mapping between a QoS flow and a data radio bearer (DRB) for both a downlink (DL) and a UL Marking QoS flow identification (ID) in both DL and UL packets Reflective QoS flow to DRB mapping for the UL SDAP PDUs As to the NR SDAP layer 1d-01 or 1d-45, the UE may be configured with information about whether to use a header and RRC message per PDCP layer, per bearer, or per logical channel. When the SDAP header is configured, a 1-bit non access stratum (NAS) reflective QoS indicator and a 1-bit access stratum (AS) reflective QoS indicator of the SDAP header may be used to indicate to the UE to update or reconfigure UL and DL QoS flow and data bearer mapping information. The SDAP header may include QoS flow ID information indicating a QoS. QoS information may be used as data processing priority information or scheduling information for appropriately supporting a service.

Main functions of the NR PDCP layer 1d-05 or 1d-40 are as follows.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in the UL.

The reordering function of the NR PDCP layer 1d-05 or 1d-40 may include reordering of PDCP PDUs received from a lower layer on a PDCP sequence number (SN) basis, delivering the reordered data to an upper layer in order, immediately delivering the data out of order, recording missing PDCP PDUs by reordering the received PDCP PDUs, reporting status information of the missing PDCP PDUs to a transmitter, and requesting to retransmit the missing PDCP PDUs.

Main functions of the NR RLC layer 1d-10 or 1d-35 are as follows.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC layer 1d-10 or 1d-35 may include delivering RLC SDUs received from a lower layer, to an upper layer in order, reassembling RLC SDUs and delivering the reassembled RLC SDU when the RLC SDUs segmented from one RLC SDU are received, reordering received RLC PDUs on a RLC SN or PDCP SN basis, recording missing RLC PDUs by reordering the received RLC PDUs, reporting status information of the missing RLC PDUs to a transmitter, requesting to retransmit the missing RLC PDUs, delivering only RLC SDUs prior to a missing RLC SDU, to an upper layer in order when the missing RLC SDU exists, delivering all RLC SDUs received before a timer starts, to an upper layer in order when a certain timer expires, even when a missing RLC SDU exists, and delivering all RLC SDUs received up to a current time, to an upper layer in order when a certain timer expires, even when a missing RLC SDU exists.

The NR RLC layer 1d-10 or 1d-35 may process the RLC PDUs in order of reception and may deliver the RLC PDUs to the NR PDCP layer 1d-05 or 1d-40 regardless of SNs (out-of-sequence delivery). When a segment is received, the NR RLC layer 1d-10 or 1d-35 may reassemble the segment with other segments stored in a buffer or subsequently received, into an entire RLC PDU and may deliver the RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or replaced with a multiplexing function of the NR MAC layer 1d-15 or 1d-30.

The out-of-sequence delivery function of the NR RLC layer 1d-10 or 1d-35 may include directly delivering RLC SDUs received from a lower layer, to an upper layer out of order, reassembling a plurality of RLC SDUs segmented from one RLC SDU and delivering the reassembled RLC SDU when the segmented RLC SDUs are received, and recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer 1d-15 or 1d-30 are as follows.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layer 1d-20 or 1d-25 may channel-code and modulate upper layer data into OFDM symbols and transmit the OFDM symbols via a wireless channel or may demodulate OFDM symbols received via a wireless channel and channel-decode and deliver the OFDM symbols to an upper layer.

Figure 1E:
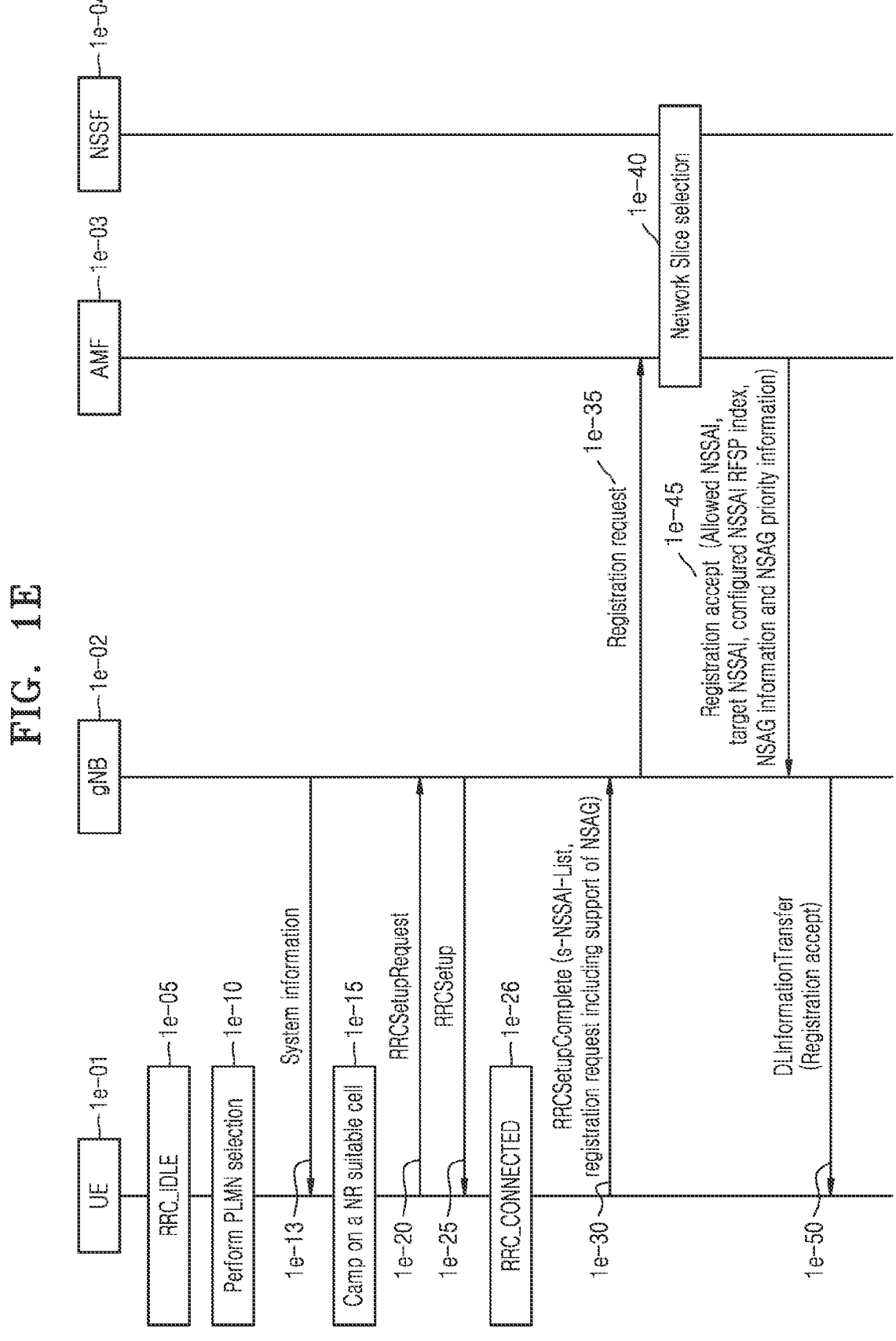
FIG. 1E illustrates a procedure in which a UE is configured with a slice group and a slice group priority order via an access and mobility management function (AMF) in a wireless communication system, according to an embodiment.

FIG. 1E illustrates a procedure in which a UE is configured with a slice group and a slice group priority order via an AMF in a wireless communication system, according to an embodiment.

The slice group of the disclosure may include one or more slices and may be referred to as a network slice AS group (NSAG). The UE supporting the NSAG may be configured with NSAG information and a priority value for each NSAG by a NAS message via the AMF. The NSAG information may be configured for each tracking area (TA) and may include at least one of an NSAG identifier (NSAG-Id) for identifying each NSAG, mapping information to which NSAG a specific slice belongs, or a tracking area identity (TAI) for each NSAG. NSAG information may include a TAI when an identical NSAG identifier is used for each TA but an NSAG includes different slices. That is, a specific NSAG not including a TAI indicates that mapping of same slices is applied in all TAs belonging to a registration area (RA) of the UE.

Referring to FIG. 1E, a UE 1e-01 may be in an RRC idle mode (RRC_IDLE) (1e-05).

In step 1e-10, the UE 1e-01 in the RRC idle mode may perform a public land mobile network (PLMN) selection procedure.

In step 1e-15, the UE 1e-01 in the RRC idle mode may camp on an NR suitable cell via a procedure for performing cell selection or cell reselection by receiving (1e-13) system information broadcast from an NR BS 1e-02.

The UE 1e-01 in the RRC idle mode may perform an RRC connection setup procedure with the cell on which the UE 1e-01 camps by transmitting an RRC connection setup request message (RRCSetupRequest) to the NR BS 1e-02. In step 1e-25, the NR BS 1e-02 may transmit an RRC connection setup message to the UE 1e-01. In step 1e-26, when receiving the RRC connection setup message, the UE 1e-01 may apply setup information included in the RRC connection setup message, and thus, may transition to an RRC connection mode (RRC_CONNECTED).

In step 1e-30, the UE 1e-01 that has transitioned to the RRC connection mode may transmit an RRC connection setup complete message to the NR BS 1e-02. If an upper layer entity provides one or more pieces of single network slice selection assistance information (S-NSSAI), the UE 1e-01 may include, in the RRC connection setup complete message, an S-NSSAI-List including values provided by the upper layer entity, and may transmit the RRC connection setup complete message to the NR BS 1e-02. The S-NSSAI-List may include one or more pieces of S-NSSAI and each S-NSSAI may be configured of slice/service type (SST) or SST and slice differentiator (SST-SD). A structure of abstract syntax notation one (ASN. 1) is as follows.
S-NSSAI The IE S-NSSAI (Single Network Slice Selection Assistance Information) identifies a Network Slice end to end and comprises a slice/service type and a slice differentiator, see TS 23.003 [21].

| S-NSSAI information element |
| --- |
| -- ASN1START |
| -- TAG-S-NSSAI-START |
| S-NSSAI ::=   CHOICE{ |
|   sst     BIT STRING (SIZE (8)), |
|   sst-SD    BIT STRING (SIZE (32)) |
| } |

-continued

| S-NSSAI information element |
| --- |
| -- TAG-S-NSSAI-STOP |
| -- ASN1STOP |

| S-NSSAI field descriptions |
| --- |
| sst |
| Indicates the S-NSSAI consisting of Slice/Service Type, see TS 23.003 [21]. |
| sst-SD |
| Indicates the S-NSSAI consisting of Slice/Service Type and Slice Differentiator, see TS 23.003 [21]. |

In step 1e-30, the UE 1e-01 may include, in the RRC connection setup complete message, a NAS message (DedicatedNAS-Message), and may transmit the RRC connection setup complete message to the NR BS 1e-02. For example, the NAS message may include a registration request message and whether an NSAG is supported.

In step 1e-35, the NR BS 1e-02 may forward the registration request message to an AMF 1e-03.

In step 1e-40, a network slicing selection function (NSSF) 1e-04 may select a network slice supportable in a 5G core and may forward information about the selected network slice to the AMF 1e-03.

In step 1e-45, the AMF 1e-03 may transmit, to the NR BS 1e-02, a registration accept message including at least one of NSAG information about one or more pieces of NSSAI or NSAG priority information. The NSAG information may include at least one of a TAI or TA, mapping information to which NSAG one or more slices belong, and an identifier for each NSAG (NSAG-Id).

Up to 32 NSAGs may be configured for each PLMN and may be unique for each PLMN.

Information for each TA may be configured.

The NSAG information and the NSAG priority information may be provided via a UE configuration command message. In step 1e-45, the registration accept message may include information about a target NSSAI that is not supported from among pieces of NSSAI requested by the UE 1e-01 and may be transmitted to the NR BS 1e-02. The registration accept message may also include a slice selection priority index value for each frequency/RAT (Index to RAT/frequency slice selection priority (RFSP index)).

In step 1e-50, the NR BS 1e-02 may transmit a DLInformationTransfer message including the registration accept message to the UE 1e-01.

Figure 1F:
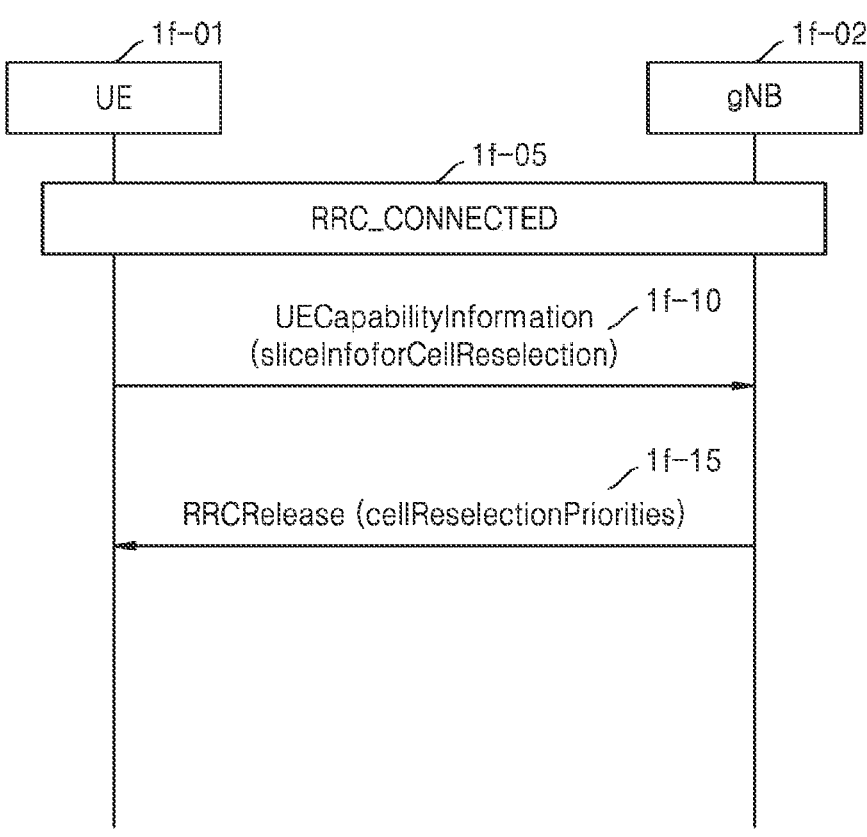
FIG. 1F illustrates a procedure in which a UE that supports slice-based cell reselection is configured with cell reselection priority configuration information (cellReselectionPriorities) via a radio resource control (RRC) connection release message (RRCRelease) from a base station (BS) in a wireless communication system, according to an embodiment.

FIG. 1F illustrates a procedure in which a UE that supports slice-based cell reselection is configured with cell reselection priority configuration information (cellReselectionPriorities) via an RRC connection release message (RRCRelease) from a BS in a wireless communication system, according to an embodiment.

The UE may support the slice-based cell reselection and may perform a slice-based cell reselection process by considering one or more NSAGs and respective priorities for the NSAGs provided by a NAS. When the UE is in a camped normally state on a suitable cell, supports the slice-based cell reselection, and receives one or more NSAGs and respective priorities for the NSAGs provided by UE NAS, the UE may derive cell reselection priorities based on the following rules.

The UE derives re-selection priorities for slice-based cell re-selection
by using:
NSAGs and their priorities provided by NAS,
sliceInfoList and or sliceInfoListDedicated per frequency with nsag-
CellReselectionPriority per NSAG, if provided in system information and/or
dedicated signalling,
cellReselectionPriority per frequency provided in system information
and/or dedicated signalling.
The UE considers an NR frequency to support all slices of an NSAG if
the corresponding nsag-ID is indicated for the NR frequency and valid for
current TA.
The UE considers a cell on an NR frequency to support all slices of an
NSAG if
the corresponding nsag-ID is indicated for the NR frequency and valid for
current TA: and
the cell is either listed in the sliceAllowedCellListNR (if provided in
the used slice specific cell reselection information) or the cell is not
listed in the sliceExcludedCellListNR (if provided in the used slice
specific cell reselection information); or
Neither sliceAllowedCellListNR nor sliceExcludedCellListNR is configured
in the used slice specific cell reselection information
The UE shall derive re-selection priorities for slice-based cell re-
selection according to the following rules:
Frequencies that support at least one prioritized NSAG received from NAS
have higher re-selection priority than frequencies that support none of
the NSAG(s) received from NAS.
Frequencies that support at least one NSAG provided by NAS are prioritised
in the order of the NAS-provided priority for the NSAG with highest
priority supported on the frequency.
Among the frequencies (one or multiple) that support the highest
prioritised NSAG(s) with the same NAS-provided priorities, the frequencies
are prioritized in the order of their highest nsag-CellReselectionPriority
given for these NSAG(s).
Frequencies that support a NSAG provided by NAS and that indicate nsag-
CellReselectionPriority for the NSAG have higher re-selection priority
than frequencies that support this prioritized NSAG without indicating
nsag-CellReselectionPriority for the NSAG.
Frequencies that support none of the NSAG(s) provided by NAS are
prioritized in the order of their cellReselectionPriority;

When the UE derives the cell reselection priorities, based on these rules, the UE may measure a frequency according to a frequency measurement rule, may perform a cell reselection evaluation process, and thus, may reselect a candidate target cell.

Referring to FIG. 1F, in step 1*f*-05, a UE 1*f*-01 performs an RRC connection to an NR BS 1*f*-02 and thus may be in an RRC connection mode (RRC_CONNECTED). The UE 1*f*-01 may be configured with NSAG information and NSAG priority information by a NAS message via an AMF.

In step 1*f*-10, the UE 1*f*-01 may transmit a UE capability information message (UECapabilityInformation) to the NR BS 1*f*-02. The UE capability information message may include at least one piece of the following information.

Whether the UE supports slice reselection information in a system information block (SIB) and on an RRCRelease for a slice based cell reselection in an RRC idle mode (RRC_IDLE) and an RRC inactive mode (RRC_INACTIVE) (sliceInfoforCellReselection)

Information indicating that the UE can monitor up to 7 NR inter-frequency carriers for cell reselection in the RRC idle mode and the RRC inactive mode Information indicating that the UE can monitor up to 7 frequency division duplex (FDD) evolved universal terrestrial radio access (E-UTRA) inter-RAT carriers for cell reselection in the RRC idle mode and the RRC inactive mode Information indicating that the UE can monitor up to 7 time division duplex (TDD) E-UTRA inter-RAT carriers for cell reselection in the RRC idle mode and the RRC inactive mode Information indicating whether the UE supports NR inter-frequency measurement in the RRC idle mode and the RRC inactive mode Information indicating whether the UE supports E-UTRA measurement in the RRC idle mode and the RRC inactive mode In step 1*f*-15, the NR BS 1*f*-02 may transmit an RRC connection release message (RRCRelease) including cell reselection priority configuration information to the UE 1*f*-01 The cell reselection priority configuration information may include at least one of the following pieces of information.

Frequency Priority List for at Least One E-UTRA (freqPriorityListEUTRA)

The FreqPriorityListEUTRA may be a list including up to maxFreq(=8) FreqPrioityEUTRA. Each FreqPriorityEUTRA may be configured of at least one of a reference radio frequency channel number value (ARFCN-ValueEUTRA) indicating a carrier frequency, a cell reselection priority value (CellReselectionPriority), or a cell reselection sub-priority value (cellReselectionSubPriority). The cell reselection priority value may be configured as an integer value from among 0 to 7, and the cell reselection sub-priority value may be configured as a decimal value from among 0.2, 0.4, 0.6, and 0.8. If the cell reselection priority value and the cell reselection sub-priority value are simultaneously configured for a specific carrier frequency, the UE may add two values to derive a cell reselection priority value. If only one of the cell reselection priority value and the cell reselection sub-priority value is configured for a specific carrier frequency, the UE may derive a cell reselection priority value based on the configured value.

Frequency Priority List for at Least One NR (freqPriorityListNR)

The FreqPriorityListNR may be a list including up to maxFreq(=8) FreqPriorityNR (according to UE capability). FreqPriorityNR may be configured of at least one of a reference radio frequency channel number value (ARFCN-ValueNR) indicating a carrier frequency, a cell reselection priority value (CellReselectionPriority), or a cell reselection sub-priority value (cellReselectionSubPriority). The UE may derive a cell reselection priority value for each NR carrier frequency.

T320 Timer Value

The timer value may be configured from among 5 minutes (min), 10 min., 20 min., 30 min., 60 min., 120 min., and 180 min or as a different value. The UE may run T320 timer with the configured timer value and may perform a cell reselection evaluation process by applying the cell reselection priority configuration information received via the RRC connection release message. That is, until the T320 timer expires or stops, the UE may perform the cell reselection evaluation process by applying the cell reselection priority configuration information received via the RRC connection release message. If the timer value is not configured, the UE may perform the cell reselection evaluation process by applying the cell reselection priority configuration information until the cell reselection priority configuration information received via the RRC connection release message is deleted. When the UE performs the cell reselection evaluation process by applying the cell reselection priority configuration information received via the RRC connection release message, the UE may ignore cell reselection priority configuration information broadcast via system information.

At least one slicing-dedicated frequency priority list (freqPriorityListDedicatedSlicing) including up to maxFreq (=8) FreqPriorityDedicatedSlicing (according to UE capability). FreqPriorityDedicatedSlicing may be configured of at least one of a reference radio frequency channel number value (ARFCN-ValueNR) indicating a carrier frequency, or a slice-dedicated information list (SliceInfoListDedicated). SliceInfoListDedicated may be configured of at least one of NSAG identity information (NSAG-IdentityInfo), an NSAG cell reselection priority value (nsag-CellReselectionPriority), or an NSAG cell reselection sub-priority value (nsag-CellReselectionSubPriority). The NSAG cell reselection priority value may be configured as an integer value from the same range of the aforementioned cell reselection priority values, and the NSAG cell reselection sub-priority value may be configured as a decimal value from the same range of the aforementioned cell reselection sub-priority values. NSAG-IdentityInfo may be configured as at least one of an NSAG identifier (NSAG-ID) or a TA code (trackingArea-Code). A cell reselection priority value for an NR carrier frequency included in each FreqPriorityDedicatedSlicing may be derived according to the aforementioned method.

The cell reselection priority configuration information included in the RRC connection release message has to be configured based on UE capability. Therefore, the disclosure teaches that the NR BS 1*f*-02 includes the cell reselection priority configuration information in the RRC connection release message via at least one of the following methods and transmits the RRC connection release message to the UE 1*f*-01.

Method 1: When a frequency priority list for NR (freqPriorityListNR) and a slicing-dedicated frequency priority list (freqPriorityListDedicatedSlicing) are simultaneously configured, a sum of a size of FreqPriorityListNR and a size of FreqPriorityListDedicatedSlicing may be configured up to X. For example, when FreqPriorityListNR includes two FreqPriorityNR, FreqPriorityListDedicatedSlicing may be configured of up to X-2 FreqPriorityDedicatedSlicing. An NR carrier frequency included in FreqPriorityListNR and an NR carrier frequency included in FreqPriorityListDedidcatedSlicing cannot have the same NR carrier frequency value. A value of X may indicate at least one of integer values greater than or equal to 8.

Method 2: When a frequency priority list for NR (freqPriorityListNR) and a slicing-dedicated frequency priority list (freqPriorityListDedicatedSlicing) are simultaneously configured, a sum of a size of FreqPriorityListNR and FreqProrityListDedicatedSlicing may be configured up to X. For example, when FreqPriorityListNR includes two FreqPriorityNR, FreqPriorityListDedicatedSlicing may be configured of up to X-2 FreqPriorityDedicatedSlicing. An NR carrier frequency included in FreqPriorityListNR and in FreqPriorityListDedidcatedSlicing can have the same NR carrier frequency value. A value of X may indicate at least one of integer values greater than or equal to 8.

Method 3: When a frequency priority list for NR (freqPriorityListNR) and a slicing-dedicated frequency priority list (freqPriorityListDedicatedSlicing) are simultaneously configured, a sum of the number of NR carrier frequencies included in FreqPriorityListNR and the number of NR carrier frequencies included in FreqPriorityListDedicatedSlicing may be configured up to X. When the same NR carrier frequency value is included in FreqPriorityListNR and FreqPriorityListDedicatedSlicing, the value may be calculated as one NR carrier frequency, and thus, a sum of the number of NR carrier frequencies may be configured up to X. A value of X may indicate at least one of integer values greater than or equal to 8.

Method 4: When a frequency priority list for NR (freqPriorityListNR) and a slicing-dedicated frequency priority list (freqPriorityListDedicatedSlicing) are simultaneously configured, a sum of the number of NR carrier frequencies included in FreqPriorityListNR and the number of NR carrier frequencies included in FreqPriorityListDedicatedSlicing may be configured up to X. Even when the same NR carrier frequency value is included in FreqPriorityListNR and FreqPriorityListDedicatedSlicing, the value may be calculated as two NR carrier frequencies, and thus, a sum of the number of NR carrier frequencies may be configured up to X. A value of X may indicate at least one of integer values greater than or equal to 8.

Method 5: When a frequency priority list for NR (freqPriorityListNR) and a slicing-dedicated frequency priority list (freqPriorityListDedicatedSlicing) are simultaneously configured, a size of FreqPriorityListNR and FreqPriorityListDedicatedSlicing may each be configured up to 8. For example, FreqPriorityListNR may maximally include 8 freqPriorityNR, FreqPriorityListDedicatedSlicing may be configured of up to 8 FreqPriorityDedicatedSlicing. That is, a size of FreqPriorityListNR and FreqPriorityListDedicatedSlicing may be independently configured.

Figure 1G:
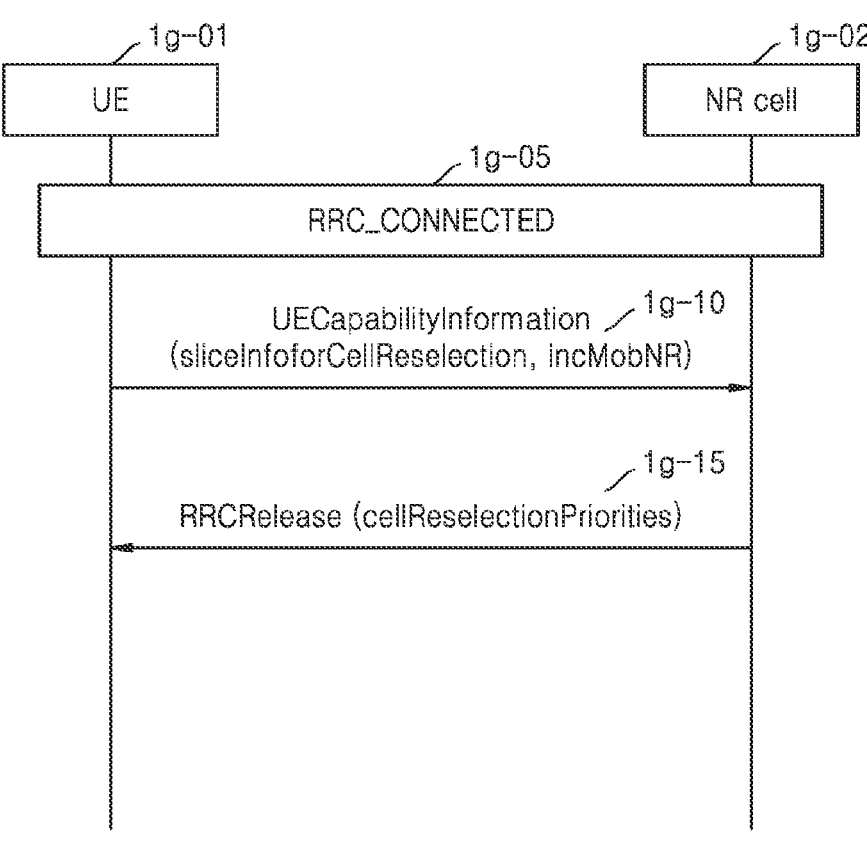
FIG. 1G illustrates a procedure in which a UE that supports slice-based cell reselection is configured with cell reselection priority configuration information (cellReselectionPriorities) via an RRCRelease message from a BS in a wireless communication system, according to an embodiment.

FIG. 1G illustrates a procedure in which a UE that supports slice-based cell reselection is configured with cell reselection priority configuration information (cellReselectionPriorities) via an RRC connection release message (RRCRelease) from a BS in a wireless communication system, according to an embodiment.

The UE may perform a slice-based cell reselection process by considering one or more NSAGs and respective priorities for the NSAGs provided by NAS. When the UE is in a camped normally state on a suitable cell, supports the slice-based cell reselection, and receives one or more NSAGs and respective priorities for the NSAGs provided by UE NAS, the UE may derive cell reselection priorities based on following rules.

---

The UE derives re-selection priorities for slice-based cell re-selection by using:
NSAGs and their priorities provided by NAS,
sliceInfoList and or sliceInfoListDedicated per frequency with nsag-CellReselectionPriority per NSAG, if provided in system information and/or dedicated signalling.
cellReselectionPriority per frequency provided in system information and/or dedicated signalling,
The UE considers an NR frequency to support all slices of an NSAG if the corresponding nsag-ID is indicated for the NR frequency and valid for current TA.
The UE considers a cell on an NR frequency to support all slices of an NSAG if
the corresponding nsag-ID is indicated for the NR frequency and valid for current TA; and
the cell is either listed in the sliceAllowedCellListNR (if provided in the used slice specific cell reselection information) or the cell is not listed in the sliceExcludedCellListNR (if provided in the used slice specific cell reselection information); or
Neither sliceAllowedCellListNR nor sliceExcludedCellListNR is configured in the used slice specific cell reselection information
The UE shall derive re-selection priorities for slice-based cell re-selection according to the following rules:
Frequencies that support at least one prioritized NSAG received from NAS have higher re-selection priority than frequencies that support none of the NSAG(s) received from NAS.
Frequencies that support at least one NSAG provided by NAS are prioritised in the order of the NAS-provided priority for the NSAG with highest priority supported on the frequency.
Among the frequencies (one or multiple) that support the highest prioritised NSAG(s) with the same NAS-provided priorities, the frequencies are prioritized in the order of their highest nsag-CellReselectionPriority given for these NSAG(s).
Frequencies that support a NSAG provided by NAS and that indicate nsag-CellReselectionPriority for the NSAG have higher re-selection priority than frequencies that support this prioritized NSAG without indicating nsag-CellReselectionPriority for the NSAG.
Frequencies that support none of the NSAG(s) provided by NAS are prioritized in the order of their cellReselectionPriority;

---

When the UE derives the cell reselection priorities based on the above rules, the UE may measure a frequency according to a frequency measurement rule, may perform a cell reselection evaluation process, and thus, may reselect a candidate target cell.

Referring to FIG. 1G, in step 1g-05, a UE 1g-01 performs an RRC connection to an NR BS 1g-02 and thus may be in an RRC connection mode (RRC_CONNECTED)). The UE 1g-01 may be configured with NSAG information and NSAG priority information by a NAS message via an AMF.

In step 1g-10, the UE 1g-01 may transmit a UE capability information message (UECapabilityInformation) to the NR BS 1g-02. The UE capability information message may include at least one piece of the following information.

Whether the UE supports slice reselection information in an SIB and on RRCRelease for slice based cell reselection in an RRC_IDLE and an RRC_INACTIVE (sliceInfoforCellReselection), Information indicating that the UE can monitor up to 7 NR inter-frequency carriers for cell reselection in the RRC idle mode and the RRC inactive mode, Information indicating that the UE can monitor up to 7 FDD E-UTRA inter-RAT carriers for cell reselection in the RRC idle mode and the RRC inactive mode,
Information indicating that the UE can monitor up to 7 TDD E-UTRA inter-RAT carriers for cell reselection in the RRC idle mode and the RRC inactive mode,
Information indicating whether the UE supports NR inter-frequency measurement in the RRC idle mode and the RRC inactive mode, Information indicating whether the UE supports E-UTRA measurement in the RRC idle mode and the RRC inactive mode, and An indicator or information about whether the UE can monitor increased NR (frequency) carriers and/or support cell reselection priorities extended with respect to NR frequencies in an RRC connection release message in an RRC idle mode and an RRC active mode of the UE or all RRC states (RRC_IDLE, RRC_INACTIVE, RRC_CONNECTED) of the UE (or an indicator or information about whether the UE can support cell reselection priorities for increased NR (frequency) carriers in an RRC connection release message) (incMobNR)

In step 1g-15, the NR BS 1g-02 may transmit an RRCRelease including cell reselection priority configuration information to the UE 1g-01. The cell reselection priority configuration information may include at least one of the following.
Frequency Priority List for at Least One E-UTRA (freqPriorityListEUTRA)

The FreqPriorityListEUTRA may be a list including up to maxFreq(=8) FreqPriorityEUTRA. Each FreqPriorityEUTRA may be configured of at least one of a reference radio frequency channel number value (ARFCN-ValueEUTRA) indicating a carrier frequency, a cell reselection priority value (CellReselectionPriority), or a cell reselection sub-priority value (cellReselectionSubPriority). The cell reselection priority value may be configured as an integer value from among 0 to 7, and the cell reselection sub-priority value may be configured as a decimal value from among 0.2, 0.4, 0.6, and 0.8. If the cell reselection priority value and the cell reselection sub-priority value are simultaneously configured for a specific carrier frequency, the UE may add two values to derive a cell reselection priority value. If only one of the cell reselection priority value and the cell reselection sub-priority value is configured for a specific carrier frequency, the UE may derive a cell reselection priority value based on the configured value.

Frequency Priority List for at Least One NR (freqPriorityListNR)

The FreqPriorityListNR may be a list including up to maxFreq(=8) FreqPriorityNR (according to UE capability). FreqPriorityNR may be configured of at least one of a reference radio frequency channel number value (ARFCN-ValueNR) indicating a carrier frequency, a cell reselection priority value (CellReselectionPriority), or a cell reselection sub-priority value (cellReselectionSubPriority). The UE may derive a cell reselection priority value for each NR carrier frequency.

T320 Timer Value

The timer value may be configured as a value from among 5 min., 10 min., 20 min., 30 min., 60 min., 120 min., and 180 min or as a different value. The UE may run the T320 timer with the configured timer value and may perform a cell reselection evaluation process by applying the cell reselection priority configuration information received via the RRC connection release message. That is, until the T320 timer expires or stops, the UE may perform the cell reselection evaluation process by applying the cell reselection priority configuration information received via the RRC connection release message. If the timer value is not configured, the UE may perform the cell reselection evaluation process by applying the cell reselection priority configuration information until the cell reselection priority configuration information received via the RRC connection release message is deleted. When the UE performs the cell reselection evaluation process by applying the cell reselection priority configuration information received via the RRC connection release message, the UE may ignore cell reselection priority configuration information broadcast via system information.

At least one slicing-dedicated frequency priority list (freqPriorityListDedicatedSlicing)

The FreqPriorityListDedicatedSlicing may include up to maxFreq(=8) FreqPriorityDedicatedSlicing (according to UE capability). FreqPriorityDedicatedSlicing may be configured of at least one of a reference radio frequency channel number value (ARFCN-ValueNR) indicating a carrier frequency, or a slice-dedicated information list (SliceInfoListDedicated). SliceInfoListDedicated may be configured of at least one of NSAG identity information (NSAG-IdentityInfo), an NSAG cell reselection priority value (nsag-CellReselectionPriority), or an NSAG cell reselection sub-priority value (nsag-CellReselectionSubPriority). The NSAG cell reselection priority value may be configured as an integer value from the same range of the aforementioned cell reselection priority values, and the NSAG cell reselection sub-priority value may be configured as a decimal value from the same range of the aforementioned cell reselection sub-priority values. NSAG-IdentityInfo may be configured as at least one of NSAG identifier (NSAG-ID) or a TA code (trackingAreaCode). A cell reselection priority value for an NR carrier frequency included in each FreqPriorityDedicatedSlicing may be derived according to the aforementioned method.

At least one frequency priority list extended for NR (freqPriorityListExtNR) when the UE supports incMobNR The FreqPriorityListExtNR may include up to Y FreqPriorityNR (according to UE capability), where Y may indicate a specific integer value.

At least one frequency priority list extended for slicing-dedicated (freqPriorityListExtDedicatedSlicing) when the UE supports incMobNR The FreqPriorityListExtDedicatedSlicing may include up to Y FreqPriorityDedicatedSlicing (according to UE capability)

The cell reselection priority configuration information included in the RRC connection release message is configured based on UE capability. Therefore, the disclosure teaches that the NR BS 1g-02 includes the cell reselection priority configuration information in the RRC connection release message via at least one of the following methods and transmits the RRC connection release message to the UE 1g-01 that supports incMobNR.

Method 1: When a sum of a size of FreqPriorityListNR and FreqPriorityListDedicatedSlicing is configured up to X (e.g., X=8), at least one of freqPriorityListExtNR or freqPriorityListExtDedicatedSlicing may be configured. A sum of sizes of FreqPriorityListExtNR and FreqPriorityListExtDedicatedSlicing may be configured up to Y (as in the aforementioned embodiment).

Method 2: When a sum of the number of NR carrier frequencies included in FreqPriorityListNR and FreqPriorityListDedicatedSlicing is configured up to X (e.g., X=8), at least one of freqPriorityListExtNR or freqPriorityListExtDedicatedSlicing may be configured. A sum of the number of NR carrier frequencies included in FreqPriorityListExtNR and FreqPriorityListExtDedicatedSlicing may be configured up to Y (as in the aforementioned embodiment). When the number of NR carrier frequencies is derived, if the same NR carrier frequency belongs to different (or same) fields, it may be calculated as one NR carrier frequency or as a separate NR carrier frequency.

Method 3: When freqPriorityListNR is configured and a size of FreqPriorityListNR is 8, freqPriorityListExtNR may be configured. FreqPriorityListExtNR may be configured up to Y (e.g., Y=8) FreqPriorityNR. When freqPriorityListDedicatedSlicing is configured and a size of FreqPriorityListDedicatedSlicing is 8, FreqPriorityListExtDedicatedSlicing may be configured. FreqPriorityListExtDedicatedSlicing may be configured up to Y (e.g., Y=8) FreqPriorityExtDedicatedSlicing.

Figure 1H:
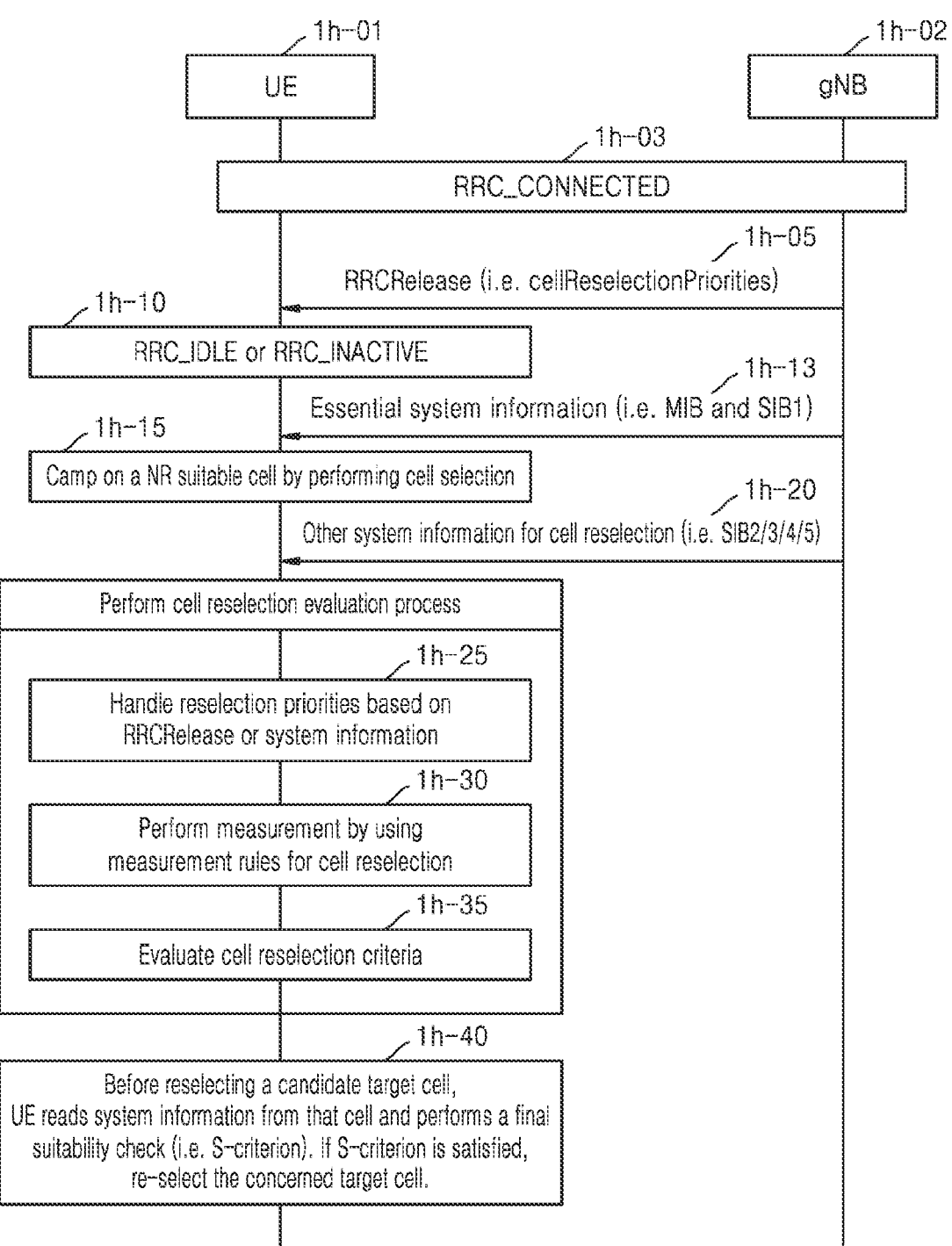
FIG. 1H illustrates that a UE that does not support slice-based cell reselection performs a cell reselection evaluation process in a wireless communication signal, according to an embodiment.

FIG. 1H illustrates that a UE that does not support slice-based cell reselection performs a cell reselection evaluation process in a wireless communication signal, according to an embodiment.

The UE performs cell reselection evaluation only on NR frequencies and inter-RAT frequencies that are given in system information and for which a cell reselection priority is provided to the UE.

That is, when a cell reselection priority frequency is provided to the UE but is not broadcast in the system information, the UE may not perform cell reselection evaluation on the frequency. Alternatively, when a specific frequency is broadcast in the system information but a cell reselection priority for the frequency is not provided to the UE, the UE may not perform cell reselection evaluation on the frequency.

Referring to FIG. 1H, in step 1*h*-03, a UE 1*h*-01 performs an RRC connection to an NR BS 1*h*-02 and thus may be in an RRC connection mode (RRC_CONNECTED).

In step 1*h*-05, the NR BS 1*h*-02 may transmit an RRCRe-lease to the UE 1*h*-01 in the RRC connection mode. in step 1*h*-10, the UE 1*h*-01 having received the RRC connection release message may apply the message and thus may transition to an RRC_IDLE or an RRC_INACTIVE. The RRC connection release message may include cell reselec-tion priority configuration information (cellReselectionPri-orities) including at least one of the following.

Frequency Priority List for E-UTRA (freqPriorityLis-tEUTRA)

The FreqPriorityListEUTRA may include a list including up to maxFreq(=8) FreqPriortyEUTRA. Each FreqPrority-EUTRA may be configured of at least one of a reference radio frequency channel number value (ARFCN-Val-ueEUTRA) indicating a carrier frequency, a cell reselection priority value (CellReselectionPriority), or a cell reselection sub-priority value (cellReselectionSubPriority). The cell reselection priority value may be configured as an integer value from among 0 to 7, and the cell reselection sub-priority value may be configured as a decimal value from among 0.2, 0.4, 0.6, and 0.8. If the cell reselection priority value and the cell reselection sub-priority value are simul-taneously configured for a specific carrier frequency, the UE may add two values to derive a cell reselection priority value. If only one of the cell reselection priority value and the cell reselection sub-priority value is configured for a specific carrier frequency, the UE may derive a cell rese-lection priority value based on the configured value.

At least one frequency priority list for NR (freqPriori-tyListNR)

The FreqPriorityListNR may include up to maxFreq(=8) FreqPriorityNR (according to UE capability) and may be configured of at least one of a reference radio frequency channel number value (ARFCN-ValueNR) indicating a car-rier frequency, a cell reselection priority value (CellRese-lectionPriority), or a cell reselection sub-priority value (cell-ReselectionSubPriority). The UE may derive a cell reselection priority value for each NR carrier frequency.

T320 Timer Value

The timer value may be configured as a value from among 5 min., 10 min., 20 min., 30 min., 60 min., 120 min., and 180 min or as a different value. The UE may run the T320 timer with the configured timer value and may perform a cell reselection evaluation process by applying the cell reselec-tion priority configuration information received via the RRC connection release message. That is, until the T320 timer expires or stops, the UE may perform the cell reselection evaluation process by applying the cell reselection priority configuration information received via the RRC connection release message. If the timer value is not configured, the UE may perform the cell reselection evaluation process by applying the cell reselection priority configuration informa-tion until the cell reselection priority configuration informa-tion received via the RRC connection release message is deleted. When the UE performs the cell reselection evalu-ation process by applying the cell reselection priority con-figuration information received via the RRC connection release message, the UE may ignore cell reselection priority configuration information broadcast via system information.

In step 1*h*-13, the UE 1*h*-01 in the RRC idle mode or the RRC inactive state may obtain essential system information from the NR BS 1*h*-02. Herein, a master information block (MIB) and an SIB1 may be referred to as essential system information.

In step 1*h*-15, the UE 1*h*-01 in the RRC idle mode or the RRC inactive state may perform a cell selection procedure based on the essential system information obtained in step 1*h*-13. That is, the UE 1*h*-01 may find an NR suitable cell belonging to a PLMN or a standalone non-public network (SNPN) selected by the UE 1*h*-01 and may camp on the cell, referred to herein as a serving cell. When a cell fulfills the conditions of Table 1 below, the cell may be defined as a suitable cell.

TABLE 1 suitable cell:
For UE not operating in SNPN Access Mode, a cell is considered as suitable if the following conditions are fulfilled:
The cell is part of either the selected PLMN or the registered PLMN or PLMN of the Equivalent PLMN list, and for that PLMN either;
The PLMN-ID of that PLMN is broadcast by the cell with no associated CAG-IDs and CAG-only indication in the UE for that PLMN (TS 23.501 ) is absent or false;
Allowed CAG list in the UE for that PLMN (TS 23.501 [10]) includes a CAG-ID broadcast by the cell for that PLMN;
The cell selection criteria are fulfilled, see clause 5.2.3.2.
According to the latest information provided by NAS:
The cell is not barred, see clause 5.3.1;
The cell is part of at least one TA that is not part of the list of "Forbidden Tracking Areas for Roaming" (TS 22.011 [18]), which belongs to a PLMN that fulfils the first bullet above.
For UE operating in SNPN Access Mode, a cell is considered as suitable if the following conditions are fulfilled:
The cell is part of either the selected SNPN or the registered SNPN of the UE:
The cell selection criteria are fulfilled, see clause 5.2.3.2;
According to the latest information provided by NAS:
The cell is not barred, see clause 5.3.1;
The cell is part of at least one TA that is not part of the list of "Forbidden Tracking Areas for Roaming" which belongs to either the selected SNPN or the registered SNPN of the UE.

When Equation (1) below is satisfied, the UE may deter-mine that cell selection criteria are fulfilled.

$$Srxlev > 0 \text{ AND } Squal > 0 \text{ where} \qquad \text{Equation (1)}$$

$$Srxlev = Qrxlevmeas - (Qrxlevmin + Qrxlevminoffset) - Pcompensation - Qoffsettemp,$$

$$Squal = Qqualmeas - (Qqualmin - Qqualminoffset) - Qoffsettemp.$$

In step 1*h*-20, in order to perform a cell reselection evaluation process, the UE 1*h*-01 in the RRC idle mode or the RRC inactive state may obtain system information (e.g., SIB2, SIB3, SIB4, or SIB5) including cell reselection infor-mation from the serving cell 1*h*-02. SIB2 may include information/parameter commonly applied for the UE 1*h*-01 to reselect an NR intra-frequency cell, an NR inter-fre-quency cell, and an inter-RAT frequency cell, and NR intra-frequency cell reselection information excluding infor-mation associated with an NR intra-frequency neighboring cell. For example, SIB2 may include cell reselection priority configuration information about a serving NR frequency (a frequency to which a currently camped cell belongs). The cell reselection priority configuration information may indi-cate cellReselectionPriority and cellReselectionSubPriority, where cellReselectionPriority may include an integer value (e.g., one integer value from among 0 to 7), and cellRese-lectionSubPriority may include a decimal value (e.g., one decimal value from among 0.2, 0.4, 0.6, and 0.8). If both cellReselectionPriority and cellReselectionSubPriority are signaled, the UE may derive a cell reselection priority value by adding two values. A larger cell reselection priority value indicates a higher priority. Cell reselection configuration information broadcast by SIB2 is as shown below in Table 2.

TABLE 2

```
SIB2 ::=                      SEQUENCE {
   cellReselectionInfoCommon            SEQUENCE {
      nrofSS-BlocksToAverage               INTEGER (2..maxNrofSS-
BlocksToAverage)      OPTIONAL,          -- Need S
      absThreshSS-BlocksConsolidation      Threshold NR
OPTIONAL,   -- Need S
      rangeToBestCell                      RangeToBestCell
OPTIONAL,   -- Need R
      q-Hyst                               ENUMERATED {
                                              dB0, dB1, dB2, dB3,
dB4, dB5, dB6, B8, dB10,
                                              dB12, dB14, dB16,
dB18, dB20, dB22, dB24}.
      speedStateReselectionPars            SEQUENCE {
         mobilityStateParameters
MobilityStateParameters,
         q-HystSF                          SEQUENCE {
            sf-Medium                         ENUMERATED {dB-6, dB-
4, dB-2, dB0},
            sf-High                           ENUMERATED {dB-6, dB-
4, dB-2, dB0)
         }
      }
OPTIONAL,    -- Need R
      ...
   },
   cellReselectionServingFreqInfo          SEQUENCE {
      s-NonIntraSearchP                    ReselectionThreshold
OPTIONAL,   -- Need S
      s-NonIntraSearchQ                    ReselectionThresholdQ
OPTIONAL,   -- Need S
      threshServingLowP                    ReselectionThreshold,
      threshServingLowQ                    ReselectionThresholdQ
OPTIONAL,   -- Need R
      cellReselectionPriority              CellReselectionPriority,
      cellReselectionSubPriority           CellReselectionSubPriority
OPTIONAL,   --- Need R
      ...
   },
   intraFreqCellReselectionInfo            SEQUENCE {
      q-RxLevMin                           Q-RxLevMin,
      q-RxLevMinSUL                        Q-RxLevMin
OPTIONAL,   -- Need R
      q-QualMin                            Q-QualMin
OPTIONAL,   -- Need S
      s-IntraSearchP                       ReselectionThreshold,
      s-IntraSearchQ                       ReselectionThresholdQ
OPTIONAL,      -- Need S
      t-ReselectionNR                      T-Reselection,
      frequencyBandList                    MultiFrequencyBandListNR-
SIB      OPTIONAL,                         -- Need S
      frequencyBandListSUL                 MultiFrequencyBandListNR-
SIB      OPTIONAL,                         -- Need R
      p-Max                                P-Max
OPTIONAL,   -- Need S
      smtc                                 SSB-MTC
OPTIONAL,   -- Need S
      ss-RSSI-Measurement                  SS-RSSI-Measurement
OPTIONAL,   -- Need R
      ssb-ToMeasure                        SSB-ToMeasure
OPTIONAL,   -- Need S
      deriveSSB-IndexFromCell              BOOLEAN, ...,
      [[
      t-ReselectionNR-SF                   SpeedStateScaleFactors
OPTIONAL   -- Need N
      ]],
      [[
      smtc2-LP-r16                         SSB-MTC2-LP-r16
OPTIONAL,   -- Need R
      ssb-PositionQCL-Common-r16           SSB-PositionQCL-Relation-
r16      OPTIONAL                          -- Cond SharedSpectrum
      ]]
   },
```

TABLE 2-continued

```
...,
[[
relaxedMeasurement-r16                          SEQUENCE {
    lowMobilityEvaluation-r16                     SEQUENCE {
        s-SearchDeltaP-r16                          ENUMERATED {
                                                        dB3, dB6, dB9,
dB12, dB15, spare3, spare2,
spare1},
        t-SearchDeltaP-r16                          ENUMERATED {
                                                        s5, s10, s20, s30,
s60, s120, s180, s240, s300,
spare7, spare6, spare5, spare4, spare3,
spare2, spare1}
        }
OPTIONAL,   -- Need R
    cellEdgeEvaluation-r16                        SEQUENCE {
        s-SearchThresholdP-r16                      ReselectionThreshold,
        s-SearchThresholdQ-r16                      ReselectionThresholdQ
OPTIONAL   -- Need R
        }
OPTIONAL,   -- Need R
    combineRelaxedMeasCondition-r16             ENUMERATED {true}
OPTIONAL,   -- Need R
    highPriorityMeasRelax-r16                   ENUMERATED {true}
OPTIONAL   -- Need R
    }
OPTIONAL   -- Need R
]]
}
RangeToBestCell    ::= Q-OffsetRange
```

SIB3 may include neighboring cell information/parameter for the UE in the RRC idle mode or the RRC inactive state to reselect an NR intra-frequency cell. For example, SIB3 may broadcast an NR intra-frequency cell list (intraFreq-NeighCellList) for reselecting an NR intra-frequency cell or a cell list (intraFreqBlackCellList) of cells for which NR intra-frequency cell reselection is disallowed. In detail, SIB3 may broadcast information as shown below in Table 3.

TABLE 3

```
SIB3 ::=                                        SEQUENCE {
    intraFreqNeighCellList                        IntraFreqNeighCellList
    OPTIONAL,   -- Need R
    intraFreqBlackCellList                        IntraFreqBlackCellList
    OPTIONAL,   -- Need R
    lateNonCriticalExtension                      OCTET STRING
    OPTIONAL, ...,
    [[
    intraFreqNeighCellList-v1610                  IntraFreqNeighCellList-v1610
    OPTIONAL,   -- Need R
    intraFreqWhiteCellList-r16                    IntraFreqWhiteCellList-r16
    OPTIONAL,   -- Cond SharedSpectrum2
    intraFreqCAG-CellList-r16                     SEQUENCE (SIZE (1..maxPLMN))
    OF IntraFreqCAG-CellListPerPLMN-r16          OPTIONAL   -- Need R
    ]]
}
IntraFreqNeighCellList ::=                       SEQUENCE (SIZE
    (1..maxCellIntra)) OF IntraFreqNeighCellInfo
IntraFreqNeighCellList-v1610 ::=                SEQUENCE (SIZE
    (1..maxCellIntra)) OF IntraFreqNeighCellInfo-v1610
IntraFreqNeighCellInfo ::=                       SEQUENCE {
    physCellId                                      PhysCellId,
    q-OffsetCell                                    Q-OffsetRange,
    q-RxLevMinOffsetCell                            INTEGER (1..8)
    OPTIONAL,   -- Need R
    q-RxLevMinOffsetCellSUL                         INTEGER (1..8)
    OPTIONAL, -- Need R
    q-QualMinOffsetCell                             INTEGER (1..8)
    OPTIONAL,   -- Need R ...
}
IntraFreqNeighCellInfo-v1610                     SEQUENCE {
    ssb-PositionQCL-r16                             SSB-PositionQCL-Relation-r16
    OPTIONAL   -- Cond SharedSpectrum2
}
```

TABLE 3-continued

| | |
|---|---|
| IntraFreqBlackCellList ::= | SEQUENCE (SIZE |
| (1..maxCellBlack)) OF PCI-Range | |
| IntraFreqWhiteCellList-r16 ::= | SEQUENCE (SIZE |
| (1..maxCellWhite)) OF PCI-Range | |
| IntraFreqCAG-CellListPerPLMN-r16 ::= SEQUENCE { | |
| plmn-IdentityIndex-r16 | INTEGER (1..maxPLMN), |
| cag-CellList-r16 | SEQUENCE (SIZE (1..maxCAG- |
| Cell-r16)) OF PCI-Range | |
| } | |

SIB4 may include information/parameter for the UE in the RRC idle mode or the RRC inactive state to reselect an NR inter-frequency cell. For example, SIB4 may broadcast one or more NR inter-frequencies and may broadcast cell reselection priority configuration information for each NR inter-frequency. The cell reselection priority configuration information for each NR inter-frequency indicates the cell-ReselectionPriority and/or cellReselectionSubPriority mapped to each NR inter-frequency, and cell reselection priority configuration information for each inter-frequency may be optionally broadcast. SIB4 may broadcast information as shown below in Table 4.

TABLE 4

| | |
|---|---|
| SIB4 ::= | SEQUENCE { |
| interFreqCarrierFreqList | InterFreqCarrierFreqList, |
| lateNonCriticalExtension | OCTET STRING |
| OPTIONAL, | |
| ..., | |
| [[ | |
| interFreqCarrierFreqList-v1610 | InterFreqCarrierFreqList- |
| v1610    OPTIONAL  -- Need R | |
| ]] | |
| } | |
| InterFreqCarrierFreqList ::= | SEQUENCE (SIZE (1..maxFreq)) OF |
| InterFreqCarrierFreqInfo | |
| InterFreqCarrierFreqList-v1610 ::= | SEQUENCE (SIZE (1..maxFreq)) OF |
| InterFreqCarrierFreqInfo-v1610 | |
| InterFreqCarrierFreqInfo ::= | SEQUENCE { |
| dl-CarrierFreq | ARFCN-ValueNR, |
| frequencyBandList | MultiFrequencyBandListNR-SIB |
| OPTIONAL,   -- Cond Mandatory | |
| frequencyBandListSUL | MultiFrequencyBandListNR-SIB |
| OPTIONAL,  -- Need R | |
| nrofSS-BlocksToAverage | INTEGER (2..maxNrofSS- |
| BlocksToAverage) | OPTIONAL, -- Need S |
| absThreshSS-BlocksConsolidation | ThresholdNR |
| OPTIONAL,  -- Need S | |
| smtc | SSB-MTC |
| OPTIONAL,  -- Need S | |
| ssbSubcarrierSpacing | SubcarrierSpacing, |
| ssb-ToMeasure | SSB-ToMeasure |
| OPTIONAL,  -- Need S | |
| deriveSSB-IndexFromCell | BOOLEAN. |
| ss-RSSI-Measurement | SS-RSSI-Measurement |
| OPTIONAL, | |
| q-RxLevMin | Q-RxLevMin, |
| q-RxLevMinSUL | Q-RxLevMin |
| OPTIONAL,  -- Need R | |
| q-QualMin | Q-QualMin |
| OPTIONAL,  -- Need S | |
| p-Max | P-Max |
| OPTIONAL,  -- Need S | |
| t-ReselectionNR | T-Reselection. |
| t-ReselectionNR-SF | SpeedStateScaleFactors |
| OPTIONAL,  -- Need S | |
| threshX-HighP | ReselectionThreshold, |
| threshX-LowP | ReselectionThreshold, |
| threshX-Q | SEQUENCE { |
| threshX-HighQ | ReselectionThresholdQ. |
| threshX-LowQ | ReselectionThresholdQ |
| } | |
| OPTIONAL,  -- Cond RSRQ | |
| cellReselectionPriority | CellReselectionPriority |
| OPTIONAL,  -- Need R | |
| cellReselectionSubPriority | CellReselectionSubPriority |
| OPTIONAL,  -- Need R | |
| q-OffsetFreq | Q-OffsetRange |
| DEFAULT dB0, | |

TABLE 4-continued

```
    interFreqNeighCellList              InterFreqNeighCellList
OPTIONAL,   -- Need R
    interFreqBlackCellList              InterFreqBlackCellList
OPTIONAL,   -- Need R
    ...
}
InterFreqCarrierFreqInfo-v1610 ::=      SEQUENCE (
    interFreqNeighCellList-v1610            InterFreqNeighCellList-v1610
OPTIONAL,   -- Need R
    smtc2-LP-r16                            SSB-MTC2-LP-r16
OPTIONAL,   -- Need R
    interFreqWhiteCellList-r16              InterFreqWhiteCellList-r16
OPTIONAL,   -- Cond SharedSpectrum2
    ssb-PositionQCL-Common-r16              SSB-PositionQCL-Relation-r16
OPTIONAL,   -- Cond SharedSpectrum
    interFreqCAG-CellList-r16               SEQUENCE (SIZE (1..maxPLMN))
OF InterFreqCAG-CellListPerPLMN-r16  OPTIONAL   -- Need R
}
InterFreqNeighCellList ::=              SEQUENCE (SIZE
    (1..maxCellInter)) OF InterFreqNeighCellInfo
InterFreqNeighCellList-v1610           SEQUENCE (SIZE
    (1..maxCellInter)) OF InterFreqNeighCellInfo-v1610
InterFreqNeighCellInfo ::=             SEQUENCE {
    physCellId                          PhysCellId,
    q-OffsetCell                        Q-Offset Range,
    q-RxLevMinOffsetCell                INTEGER (1..8)
OPTIONAL,   -- Need R
    q-RxLevMinOffsetCellSUL             INTEGER (1..8)
OPTIONAL,   -- Need R
    q-QualMinOffsetCell                 INTEGER (1..8)
OPTIONAL,   -- Need R
    ...
}
InterFreqNeighCellInfo-v1610 ::=       SEQUENCE {
    ssb-PositionQCL-r16                      SSB-PositionQCL-Relation-r16
OPTIONAL   -- Cond SharedSpectrum2
}
InterFreqBlackCellList ::=             SEQUENCE (SIZE
    (1..maxCellBlack)) OF PCI-Range
InterFreqWhiteCellList-r16 ::=         SEQUENCE (SIZE
    (1..maxCellWhite)) OF PCI-Range
InterFreqCAG-CellListPerPLMN-r16 ::= SEQUENCE {
    plmn-IdentityIndex-r16              INTEGER (1..maxPLMN),
    cag-CellList-r16                    SEQUENCE (SIZE (1..maxCAG-
    Cell-r16)) OF PCI-Range
}
```

SIB5 may include information/parameters for the UE in the RRC idle mode or the RRC inactive state to reselect an inter-RAT frequency cell. For example, SIB5 may broadcast one or more EUTRA frequencies and cell reselection priority configuration information for each EUTRA frequency. The cell reselection priority configuration information for each EUTRA frequency indicates the cellReselectionPriority and/or cellReselectionSubPriority mapped to each EUTRA frequency, and cell reselection priority configuration information for each EUTRA frequency may be optionally broadcast. SIB5 may broadcast information as shown below in Table 5.

TABLE 5

```
SIB5 ::=                              SEQUENCE {
    carrierFreqListEUTRA                CarrierFreqListEUTRA
OPTIONAL,   -- Need R
    t-ReselectionEUTRA                  T-Reselection,
    t-ReselectionEUTRA-SF               SpeedStateScaleFactors
OPTIONAL,   -- Need S
    lateNonCriticalExtension            OCTET STRING
OPTIONAL, ...,
    [[
    carrierFreqListEUTRA-v1610          CarrierFreqListEUTRA-v1610
OPTIONAL   -- Need R
    ]]
}
CarrierFreqListEUTRA ::=              SEQUENCE (SIZE (1..maxEUTRA-Carrier)) OF
    CarrierFreqEUTRA
CarrierFreqListEUTRA-v1610 ::=        SEQUENCE (SIZE (1..maxEUTRA-Carrier)) OF
    CarrierFreqEUTRA-v1610
CarrierFreqEUTRA ::=                  SEQUENCE {
    carrierFreq                             ARFCN-ValueEUTRA,
```

TABLE 5-continued

```
    eutra-multiBandInfoList        EUTRA-MultiBandInfoList
    OPTIONAL,  -- Need R
    eutra-FreqNeighCellList        EUTRA-FreqNeighCellList
    OPTIONAL,  -- Need R
    eutra-BlackCellList            EUTRA-FreqBlackCellList
    OPTIONAL,  -- Need R
    allowedMeasBandwidth           EUTRA-AllowedMeasBandwidth,
    presenceAntennaPort1           EUTRA-PresenceAntennaPort1,
    cellReselectionPriority        CellReselectionPriority
    OPTIONAL,  -- Need R
    cellReselectionSubPriority     CellReselectionSubPriority
    OPTIONAL,  -- Need R
    threshX-High                   ReselectionThreshold,
    threshX-Low                    ReselectionThreshold,
    q-RxLevMin                     INTEGER (-70..-22),
    q-QualMin                      INTEGER (-34..-3),
    p-MaxEUTRA                     INTEGER (-30..33),
    threshX-Q                      SEQUENCE {
        threshX-HighQ                  ReselectionThresholdQ.
        threshX-LowQ                   ReselectionThresholdQ
    }
  OPTIONAL   -- Cond RSRQ
}
CarrierFreqEUTRA-v1610 ::= SEQUENCE {
    highSpeedEUTRACarrier-r16      ENUMERATED {true}
    OPTIONAL   -- Need R
}
EUTRA-FreqBlackCellList ::=        SEQUENCE (SIZE (1..maxEUTRA-CellBlack)) OF
EUTRA-PhysCellIdRange
EUTRA-FreqNeighCellList ::=        SEQUENCE (SIZE (1..maxCellEUTRA)) OF EUTRA-
FreqNeighCellInfo
EUTRA-FreqNeighCellInfo ::=        SEQUENCE {
    physCellId                     EUTRA-PhysCellId,
    dummy                          EUTRA-Q-OffsetRange,
    q-RxLevMinOffsetCell           INTEGER (1..8)
    OPTIONAL,  -- Need R
    q-QualMinOffsetCell            INTEGER (1..8)
    OPTIONAL   -- Need R
}
```

The UE in the RRC idle mode or the RRC inactive state may perform a cell reselection evaluation process indicating a series of processes including reselection priorities handling, performing frequency measurement by applying measurement rules for cell reselection, and evaluating cell reselection criteria and reselecting a cell.

In step 1h-25, when the UE 1h-01 in the RRC idle mode or the RRC inactive state receives the cell reselection priority configuration information in step 1h-05, the UE 1h-01 may determine a cell reselection priority by applying the cell reselection priority configuration information configured by the RRC connection release message in step 1h-05. In step 1h-05, when the cell reselection priority configuration information is not configured or the cell reselection priority configuration information configured by the RRC connection release message is released, the UE 1h-01 may determine a cell reselection priority based on the system information received in step 1h-20. The UE 1h-01 may determine cell reselection priorities only for frequencies broadcast by the system information. The UE 1h-01 may determine, based on a cell reselection priority value mapped to an NR frequency to which a serving cell on which the UE 1h-01 currently camps belongs, whether a cell reselection priority for each NR inter-frequency or each inter-RAT frequency has a higher, lower, or identical cell reselection priority as that of the NR frequency to which the serving cell belongs. For example, when the cell reselection priority value mapped to the NR frequency to which the serving cell on which the UE 1h-01 currently camps belongs is 3, a cell reselection priority value of inter NR frequency 1 is 2, a cell reselection priority value of inter NR frequency 2 is 3, a cell reselection priority value of inter NR frequency 3 is 4, and a cell reselection priority value of EUTRA frequency 1 is 2, the UE may determine inter NR frequency 1 and EUTRA frequency 1 as a lower reselection priority, may determine a cell reselection priority of inter NR frequency 2 as an identical reselection priority, and may determine a cell reselection priority of inter NR frequency 3 as a higher reselection priority.

In step 1h-30, the UE 1h-01 in the RRC idle mode or the RRC inactive state may perform frequency measurement for cell reselection. To minimize battery consumption, the UE 1h-01 may perform frequency measurement by using the below measurement rules according to the cell reselection priority determined in step 1h-25.

When a reception level (Srxlev) of the serving cell is greater than a threshold value of SIntraSearchP, and a reception quality (Squal) of the serving cell is greater than SIntraSearchQ (Serving cell fulfils Srxlev>SIntraSearchP and Squal>SIntraSearchQ), the UE may not perform NR intra-frequency measurement. Otherwise, the UE performs NR intra-frequency measurement.

For NR inter-frequency or inter-RAT frequency of which cell reselection priority is higher than the NR frequency of the current serving cell, the UE may perform measurement according to specification rules.

For an NR inter-frequency of which cell reselection priority is less than or equal to the NR frequency of the current serving cell and an inter-RAT frequency of which cell reselection priority is lower than the NR frequency of the current serving cell, the UE may not perform measurement when a reception level (Srxlev) of the serving cell is greater than a threshold value of SnonIntraSearchP, and a reception quality (Squal) of the serving cell is greater than SnonIntraSearchQ (Serving cell fulfils Srxlev>SnonIntraSearchP and Squal>SnonIntraSearchQ). Otherwise, the UE may measure cells in an NR inter-frequency of which cell reselection priority is less than or equal to the NR frequency or may measure cells in an inter-RAT frequency of which cell reselection priority is lower than the NR frequency.

The aforementioned threshold values (SintraSearchP, SintraSearchQ, SnonIntraSearchP SnonintraSearchQ) may be broadcast by the system information obtained in step 1h-20.

In step 1h-35, the UE 1h-01 in the RRC idle mode or the RRC inactive state may determine to reselect a cell fulfilling cell reselection criteria, based on a value of the measurement performed in step 1h-30. The cell reselection criteria may vary according to cell reselection priorities. When multiple cells that fulfill the cell reselection criteria have different cell reselection priorities, reselection of frequency/RAT cell having a high cell reselection priority may precede reselection of frequency/RAT cell having a low cell reselection priority (Cell reselection to a higher priority RAT/frequency are prioritized ahead of a lower priority RAT/frequency if multiple cells of different priorities fulfil the cell reselection criteria). Operations of the UE with respect to cell reselection criteria for inter-frequency/inter-RAT cell having a higher priority than a frequency of the current serving cell are as follows.

In a first operation, if SIB2 includes and broadcasts a threshold value with respect to threshServingLowQ and 1 second has elapsed after the UE camps on the current serving cell, when a signal quality (Squal) of inter-frequency/inter-RAT cell is greater than a threshold value ThreshX, HighQ during a particular time interval TreselectionRAT (Squal>ThreshX,HighQ during a time interval TreselectionRAT), the UE may perform reselection to the inter-frequency/inter-RAT cell.

In a second operation, when the UE cannot perform the first operation, the UE performs the second operation. When 1 second has elapsed after the UE camps on the current serving cell and a reception level (Srxlev) of inter-frequency/inter-RAT cell is greater than a threshold value ThreshX,HighP during a particular time interval TreselectionRAT (Srxlev>ThreshX, HighP during a time interval Treselection-RAT-), the UE may perform reselection to the inter-frequency/inter-RAT cell.

The UE performs the first operation or the second operation based on a signal quality (Squal), a reception level (Srxlev), threshold values (ThrehX, HighQ, ThreshX, HighP), and TreselectionRAT value information of an inter-frequency cell which are included in SIB4 being broadcast from the serving cell, and based on a signal quality (Squal), a reception level (Srxlev), threshold values (ThreshX, HighQ, ThreshX, HighP), and TreselectionRAT value information of an inter-RAT cell which are included in SIB5 being broadcast from the serving cell. For example, when SIB4 includes a Qqualmin value or a Qrxlevmin value, the UE derives the signal quality (Squal) or the reception level (Srxlev) of the inter-frequency cell, based on the value of SIB4. If a plurality of cells that fulfill a high cell reselection priority exists in an NR frequency, the UE may reselect a highest ranked cell from among cells that fulfill reselection criteria of intra-frequency/inter-frequency cells having the same priority as a frequency of the current serving cell.

Operations of the UE with respect to the reselection criteria of intra-frequency/inter-frequency cells having the same priority as a frequency of the current serving cell are as follows.

In a third operation, when a signal quality (Squal) and a reception level (Srxlev) of intra-frequency/inter-frequency cells are greater than 0, the UE derives a rank for each cell, based on a reference signal received power (RSRP). The UE shall perform ranking of all cells that fulfil the cell selection criterion S. Ranks of the serving cell and a neighboring cell are calculated by using Equation (2) as follows.

(2)

$$Rs = Qmeas, s + Qhyst \qquad \text{Equation (2)}$$
$$Rn = Qmeas, n - Qoffset$$

Qmeas,s is an RSRP measurement value of the serving cell, Qmeas,n is an RSRP measurement value of the neighboring cell, Qhyst is a hysteresis value of the serving cell, and Qoffset is an offset between the serving cell and the neighboring cell. SIB2 includes a value of Qhyst, and the value is commonly used in reselection of intra-frequency/inter-frequency cells. In a case of reselection of an intra-frequency cell, Qoffset is signaled for each cell, is applied only to a designated cell, and is included in SIB3. In reselection of an inter-frequency cell, Qoffset is signaled for each cell, is applied only to a designated cell, and is included in SIB4. When a rank of the neighboring cell which is calculated by using Equation (2) is greater than a rank of the serving cell (R−n>Rs), reselection is performed on an optimal cell from among neighboring cells.

Operations of the UE with respect to the reselection criteria of inter-frequency/inter-RAT cells having a lower priority than the frequency of the current serving cell are as follows.

In a fourth operation, if SIB2 includes and broadcasts a threshold value with respect to threshServingLowQ and 1 second has elapsed after the UE camps on the current serving cell, when a signal quality (Sqaul) of the current serving cell is less than a threshold value ThreshServing, LowQ (Squal<ThreshServing, LowQ), and a signal quality (Squal) of inter-frequency/inter-RAT cell is greater than a threshold value ThreshX, LowQ-during a particular time interval TreselectionRAT (Squal>ThreshX, LowQ during a time interval TreselectionRAT), the UE may perform reselection to the inter-frequency/inter-RAT cell.

In a fifth operation, when the UE cannot perform the fourth operation, the UE performs the fifth operation. When 1 second has elapsed after the UE camps on the current serving cell and a reception level (Srxlev) of the current serving cell is less than a threshold value ThreshServing, LowP (Srxlev<ThreshServing, LowP), and a reception level (Srxlev) of inter-frequency/inter-RAT cell is greater than a threshold value ThreshX, LowQ-during a particular time interval TreselectionRAT (Srxlev>ThreshX,LowP during a time interval TreselectionRAT), the UE may perform reselection to the inter-frequency/inter-RAT.

The UE performs the fourth operation or the fifth operation with respect to an inter-frequency cell, based on threshold values (ThreshServing, LowQ, ThreshServing, LowP) included in SIB2 being broadcast from the serving cell and a signal quality (Squal), a reception level (Srxlev), threshold values (ThrehX, LowQ, ThreshX, LowP), and Treselection-RAT of the inter-frequency cell which are included in SIB4 being broadcast from the serving cell, and performs the fourth operation or the fifth operation with respect to an inter-RAT cell, based on threshold values (ThreshServing, LowQ, ThreshServing, LowP) included in SIB2 being broadcast from the serving cell and a signal quality (Squal), a reception level (Srxlev), threshold values (ThreshX, LowQ, ThreshX, LowP), and TreselectionRAT of the inter-RAT cell which are included in SIB5 being broadcast from the serving cell. For example, when SIB4 includes a Qqualmin value or a Qrxlevmin value, the UE derives the signal quality (Squal) or the reception level (Srxlev) of the inter-frequency cell based on the value of SIB4. If a plurality of cells that fulfill a high cell reselection priority exists in an NR frequency, the UE may reselect a highest ranked cell from among cells that fulfill reselection criteria of intra-frequency/inter-frequency cells having the same priority as a frequency of the current serving cell.

In step 1h-40, the UE 1h-01 in the RRC idle mode or the RRC inactive state receives system information (e.g., MIB or SIB1) broadcast from a candidate target cell before the UE 1h-01 finally reselects the candidate target cell, and determines, based on the system information, whether a reception level (Srxlev) and a reception quality (Squal) of the candidate target cell fulfill (Srxlev>0 AND Squal>0) cell selection criterion referred to as S-criterion (Equation (1)). When Equation (1) is fulfilled and the candidate target cell is suitable, the UE 1h-01 may reselect the candidate target cell.

Figure 1I:
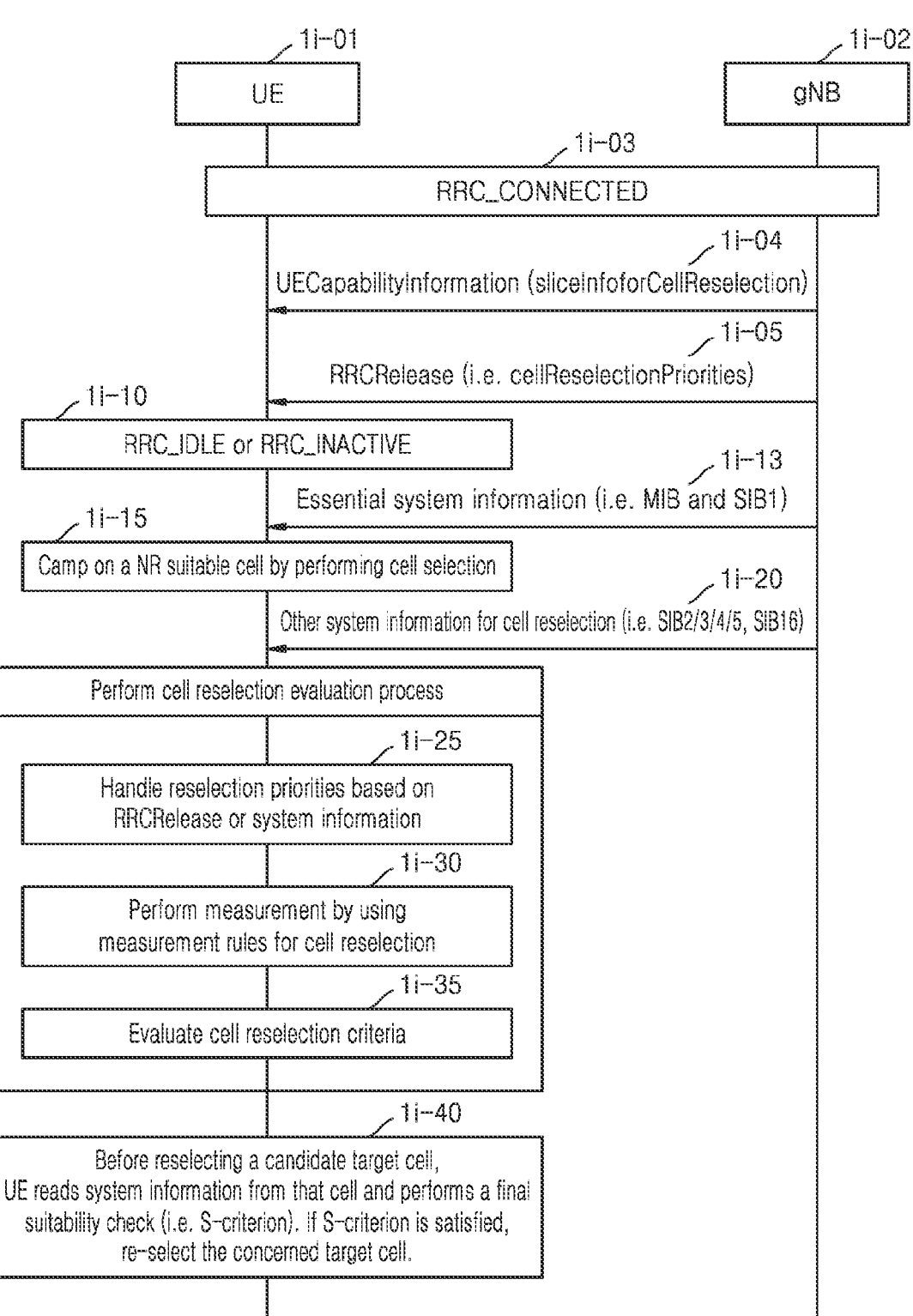
FIG. 1I illustrates that a UE that supports slice-based cell reselection performs a cell reselection evaluation process by applying cell reselection priority information included in an RRCRelease message in a wireless communication system, according to an embodiment.

FIG. 1I illustrates that a UE that supports slice-based cell reselection performs a cell reselection evaluation process by applying cell reselection priority information included in an RRCRelease in a wireless communication system, according to an embodiment.

The UE may be configured with NSAG information and a priority value for each NSAG by a NAS message via an AMF. The UE performs cell reselection evaluation when NR frequencies are broadcast by system information indicating that NSAG information provided from a NAS entity is supported, and for which the UE attempts to derive or can derive a cell reselection priority, even when cell reselection priority values (nsag-CellReselectionPriority and/or nsag-CellReselectionSubPriority) for NSAG(s) configured with respect to specific NR frequencies are not explicitly provided from a BS.

The NR frequencies for which the UE attempts to or can derive a cell reselection priority may indicate the following.

The NSAG information provided from a UE NAS entity indicates an NR frequency supported as an NR frequency configured in FreqPriorityDedicatedSlicing. That is, even when an NR frequency supporting NSAG does not have cell reselection priority values (nsag-CellReselectionPriority and nsag-CellReselectionSubPriority) associated with the NSAG, the UE can derive a cell reselection priority with respect to the NR frequency, according to preset rules. Therefore, even when an NR frequency supporting NSAG does not have fields for cell reselection priority values (nsag-CellReselectionPriority and nsag-CellReselectionSubPriority), the UE may perform a cell reselection evaluation process with respect to the NR frequency. When the NSAG information provided from the UE NAS entity is supported in an NR frequency configured in FreqPriorityDedicatedSlicing but system information does not support NSAG in the NR frequency, a UE AS entity may not perform a cell reselection evaluation process with respect to the NR frequency.

The UE performs cell reselection evaluation on NR frequencies and inter-RAT frequencies for which the UE is provided cell reselection priorities via broadcast system information (NR frequencies and inter-RAT frequencies that are given in system information and for which the UE has a priority provided).

Referring to FIG. 1I, in step 1i-03, a UE 1i-01 may have set up RRC connection to an NR BS 1i-02 and thus may be RRC_CONNECTED. The UE 1i-01 may be configured with NSAG information and NSAG priority information by a NAS message via an AMF.

In step 1i-04, the UE 1i-01 may transmit a UE capability information message (UECapabilityInformation) to the NR BS 1i-02. The UE capability information message may include information indicating whether the UE supports slice reselection information in an SIB and on RRCRelease for slice based cell reselection in an RRC_IDLE mode and an RRC_INACTIVE mode (sliceInfoforCellReselection).

In step 1i-05, the NR BS 1i-02 may transmit an RRCRelease message to the UE 1i-01 in the RRC connection mode. In step 1i-10, the UE 1i-01 having received the RRC connection release message may transition to an RRC_IDLE or RRC_INACTIVE mode. The RRC connection release message may include cellReselectionPriorities having at least one of a frequency priority list for NR (freqPriorityListNR), a T320 timer value, and a slicing-dedicated frequency priority list (freqPriorityListDedicatedSlicing).

In step 1i-13, the UE 1i-01 in the RRC idle mode or the RRC inactive state may obtain essential system information from the NR BS 1i-02.

In step 1i-15, the UE 1i-01 in the RRC idle mode or the RRC inactive state may perform a cell selection procedure based on the essential system information obtained in step 1i-13. That is, the UE 1i-01 may find an NR suitable cell belonging to a PLMN or a SNPN selected by the UE 1i-01 and may camp on the cell.

In step 1i-20, to perform a cell reselection evaluation process, the UE 1i-01 in the RRC idle mode or the RRC inactive state may obtain system information (e.g., SIB2, SIB3, SIB4, SIB5, or SIB16) including cell reselection information from the serving cell 1i-02. SIB16 may include information for performing slice-based cell reselection, i.e., may broadcast information as shown below in Table 6.

TABLE 6

| | |
|---|---|
| SIB16-r 17 ::= | SEQUENCE { |
| freqPriorityListSlicing-r17 | FreqPriorityListSlicing-r17 |
| OPTIONAL, -- Need R | |
| lateNonCriticalExtension | OCTET STRING |
| OPTIONAL, | |
| ... | |
| } | |
| FreqPriorityListSlicing-r17 ::= | SEQUENCE (SIZE (1..maxFreqPlus1)) OF |
| FreqPrioritySlicing-r17 | |

TABLE 6-continued

| | |
|---|---|
| FreqPrioritySlicing-r17 ::= | SEQUENCE { |
|     dl-ImplicitCarrierFreq-r17 | INTEGER (0..maxFreq). |
|     sliceInfoList-r17 | SliceInfoList-r17 |
|     OPTIONAL -- Need R | |
| } | |
| SliceInfoList-r17 ::= | SEQUENCE (SIZE (1..maxSliceInfo- |
|   r17)) OF SliceInfo-r17 | |
| SliceInfo-r17 ::= | SEQUENCE { |
|     nsag-IdentityInfo-r17 | NSAG-IdentityInfo-r17, |
|     nsag-CellReselectionPriority-r17 | CellReselectionPriority |
|     OPTIONAL, -- Need R | |
|     nsag-CellReselectionSubPriority-r17 | |
|     CellReselectionSubPriority | |
|     OPTIONAL, -- Need R | |
|     sliceCellListNR-r17 | CHOICE { |
|       sliceAllowedCellListNR-r17 | SliceCellListNR-r17, |
|       sliceExcludedCellListNR-r17 | SliceCellListNR-r17 |
|     } | |
|     OPTIONAL -- Need R | |
| } | |
| SliceCellListNR-r17 ::= | SEQUENCE (SIZE (1..maxCellSlice- |
|   r17)) OF PCI-Range | |

FreqPrioritySlicing field descriptions dl-ImplicitCarrierFreq
Indicates the downlink carrier frequency to which sliceInfoList is
associated with. The frequency is signalled implicitly, value 0
corresponds to the serving frequency, value 1 corresponds to the
first frequency indicated by the InterFreqCarrierFreqList in
SIB4, and value 2 coresponds to the second frequency indicated by
the InterFreqCarrierFreqList in SIB4, and so on.

SliceInfo field descriptions nsag-IdentityInfo
This is the NSAG identifier of the NSAG.
sliceAllowedCellListNR
List of allow-listed neighbouring cells for slicing. If present,
cells not listed in this list do not support the corresponding
nsag-frequency pair, according to 38.304 [20], clause 5.2.4.11.
sliceCellListNR
Contains either the list of allow-listed or exclude-listed
neighbour cells for slicing.
sliceExcludedCellListNR
List of exclude-listed neighbouring cells for slicing. If present,
cells not listed in this list support the corresponding slice
nsag-frequency pair, according to 38.304 [20], clause 5.2.4.11.

The UE 1i-01 in the RRC idle mode or the RRC inactive state may perform a cell reselection evaluation when NR frequencies that are broadcast by system information indicate that NSAG information provided from a NAS entity is supported, and for which the UE attempts to derive or can derive a cell reselection priority, even when cell reselection priority values (nsag-CellReselectionPrority and/or nsag-CellReselectionSubPriority) for NSAG(s) configured with respect to specific NR frequencies are not explicitly provided from a BS.

The UE performs cell reselection evaluation on NR frequencies and inter-RAT frequencies for which the UE is provided cell reselection priorities via broadcast system information (NR frequencies and inter-RAT frequencies that are given in system information and for which the UE has a priority provided).

The cell reselection evaluation process may indicate a series of processes including reselection priorities handling, performing frequency measurement by applying measurement rules for cell reselection, and evaluating cell reselection criteria and reselecting a cell.

In step 1i-25, the UE 1i-01 in the RRC idle mode or the RRC inactive state may determine a cell reselection priority by applying the cell reselection priority configuration information configured by the RRC connection release message in step 1i-05. In step 1i-05, when the cell reselection priority configuration information is not configured or the cell reselection priority configuration information configured by the RRC connection release message is released, the UE 1i-01 may determine a cell reselection priority based on the system information received in step 1i-20.

In step 1i-30, the UE 1i-01 in the RRC idle mode or the RRC inactive state may perform frequency measurement for cell reselection. To minimize battery consumption, the UE 1i-01 may perform frequency measurement by using the aforementioned measurement rules for cell reselection, according to the cell reselection priority determined in step 1i-25.

In step 1i-35, the UE 1i-01 in the RRC idle mode or the RRC inactive state may determine to reselect a cell fulfilling cell reselection criteria, based on a value of the measurement performed in step 1i-30.

In step 1i-40, the UE 1i-01 in the RRC idle mode or the RRC inactive state receives an MIB or SIB1 broadcast from a candidate target cell before the UE 1i-01 finally reselects the candidate target cell. When a reception level (Srxlev) and a reception quality (Squal) of the candidate target cell fulfill (Srxlev>0 AND Squal>0) cell selection criterion referred to as S-criterion, the UE 1i-01 may reselect the candidate target cell.

Figure 1J:
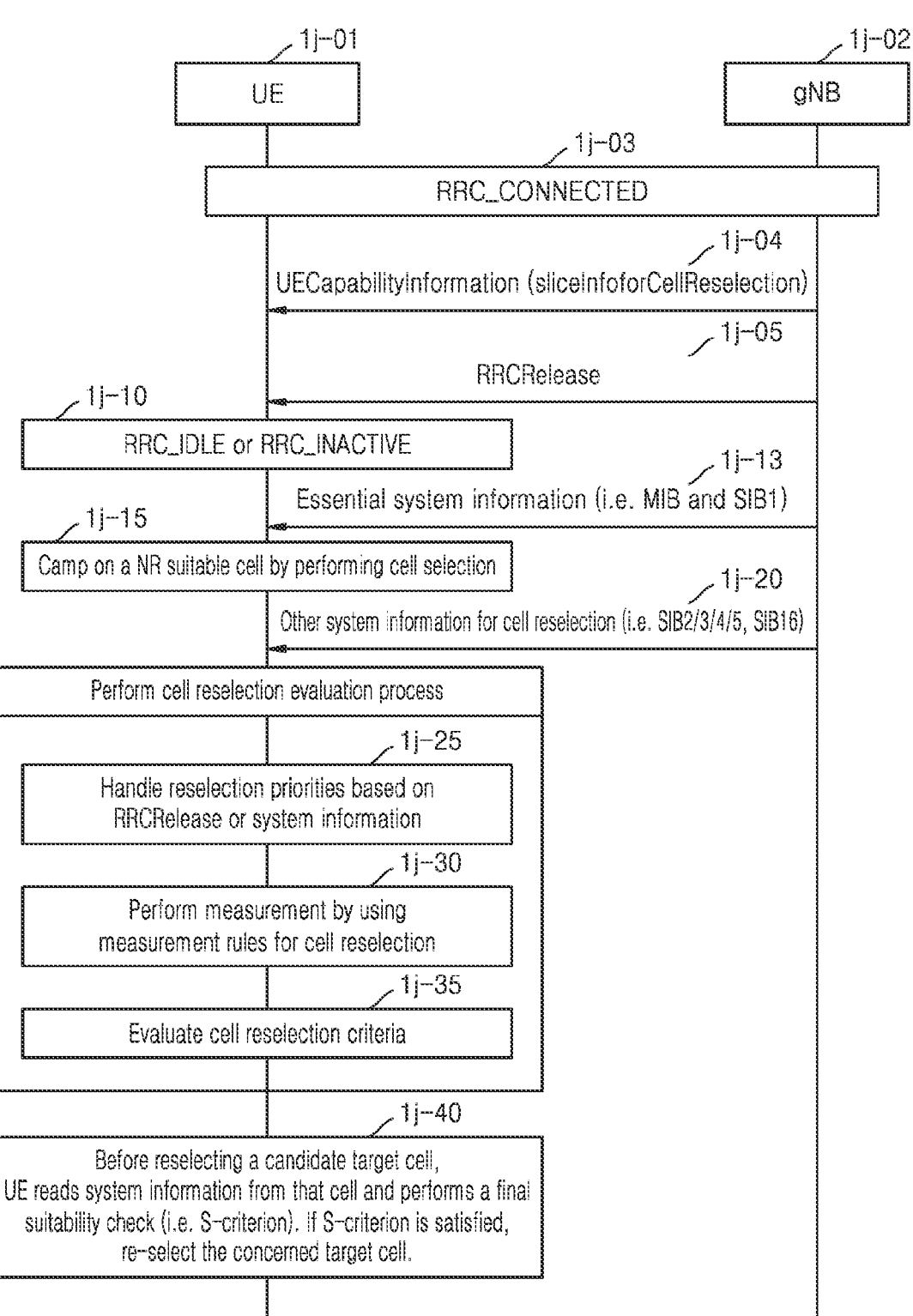
FIG. 1J illustrates that a UE that supports slice-based cell reselection performs a cell reselection evaluation process by applying cell reselection priority information, based on system information, in a wireless communication system, according to an embodiment.

FIG. 1J illustrates that a UE that supports slice-based cell reselection performs a cell reselection evaluation process by applying cell reselection priority information, based on system information, in a wireless communication system, according to an embodiment.

The UE may be configured with NSAG information and a priority value for each NSAG by a NAS message via an AMF. The UE performs cell reselection evaluation when NR frequencies are broadcast by system information indicating that NSAG information provided from a NAS entity is supported, and for which the UE attempts to derive or can derive a cell reselection priority, even when cell reselection priority values (nsag-CellReselectionPriority and/or nsag-CellReselectionSubPriority) for NSAG(s) configured with respect to specific NR frequencies are not explicitly provided from a BS.

The NR frequencies for which the UE attempts to or can derive a cell reselection priority may indicate that the NSAG information provided from a UE NAS entity indicates an NR frequency supported as an NR frequency broadcast by FreqPrioritySlicing. That is, even when an NR frequency supporting NSAG does not have cell reselection priority values (nsag-CellReselectionPriority and nsag-CellReselectionSubPriority) associated with the NSAG, the UE can derive a cell reselection priority with respect to the NR frequency, according to preset rules. Therefore, even when an NR frequency supporting NSAG does not have fields for cell reselection priority values (nsag-CellReselectionPriority and nsag-CellReselectionSubPriority), the UE may perform a cell reselection evaluation process with respect to the NR frequency. When the NSAG information provided from the UE NAS entity is supported in an NR frequency configured in FreqPriorityDedicatedSlicing but system information does not support NSAG in the NR frequency, a UE AS entity may not perform a cell reselection evaluation process with respect to the NR frequency.

The disclosed UE performs cell reselection evaluation on NR frequencies and inter-RAT frequencies for which the UE is provided cell reselection priorities via broadcast system information (NR frequencies and inter-RAT frequencies that are given in system information and for which the UE has a priority provided).

Referring to FIG. 1J, in step 1j-03, a UE 1j-01 performs RRC connection to an NR BS 1j-02 and thus may be in an RRC_CONNECTED mode. The UE 1j-01 may be configured with NSAG information and NSAG priority information by a NAS message via an AMF.

In step 1j-04, the UE 1j-01 may transmit a UE capability information message (UECapabilityInformation) to the NR BS 1j-02. The UE capability information message may include information indicating whether the UE supports slice reselection information in an SIB and on RRCRelease for slice based cell reselection in an RRC_IDLE mode and an RRC_INACTIVE mode (sliceInfoforCellReselection).

In step 1j-05, the NR BS 1j-02 may transmit an RRCRelease message to the UE 1j-01 in the RRC connection mode. In step 1j-10, the UE 1j-01 having received the RRC connection release message may apply the message and thus may transition to an RRC_IDLE or RRC_INACTIVE mode. The RRC connection release message does not include cell reselection priority configuration information (cellReselectionPriorities).

In step 1j-13, the UE 1j-01 in the RRC idle mode or the RRC inactive state may obtain essential system information from the NR BS 1j-02.

In step 1j-15, the UE 1j-01 in the RRC idle mode or the RRC inactive state may perform a cell selection procedure based on the essential system information obtained in step 1j-13. That is, the UE 1j-01 may find an NR suitable cell belonging to a PLMN or a SNPN selected by the UE 1j-01 and may camp on the cell.

In step 1j-20, to perform a cell reselection evaluation process, the UE 1j-01 in the RRC idle mode or the RRC inactive state may obtain system information (e.g., SIB2, SIB3, SIB4, SIB5, or SIB16) including cell reselection information from the serving cell 1j-02. SIB16 may include information for performing slice-based cell reselection, i.e., may broadcast information as shown below in Table 7.

TABLE 7

| | |
|---|---|
| SIB16-r17 ::= | SEQUENCE { |
| freqPriorityListSlicing-r17 | FreqPriorityListSlicing-r17 |
| OPTIONAL, -- Need R | |
| lateNonCriticalExtension | OCTET STRING |
| OPTIONAL, | |
| ... | |
| } | |
| FreqPriorityListSlicing-r17 ::= | SEQUENCE (SIZE (1..maxFreqPlus1)) OF |
| FreqPrioritySlicing-r17 | |
| FreqPrioritySlicing-r17 ::= | SEQUENCE { |
| dl-ImplicitCarrierFreq-r17 | INTEGER (0..maxFreq). |
| sliceInfoList-r17 | SliceInfoList-r17 |
| OPTIONAL -- Need R | |
| } | |
| SliceInfoList-r17 ::= | SEQUENCE (SIZE (1..maxSliceInfo- |
| r17)) OF SliceInfo-r17 | |
| SliceInfo-r17 ::= | SEQUENCE { |
| nsag-IdentityInfo-r17 | NSAG-IdentityInfo-r17, |
| nsag-CellReselectionPriority-r17 | CellReselectionPriority |
| OPTIONAL, -- Need R | |
| nsag-CellReselectionSubPriority-r17 | |
| CellReselectionSubPriority | |
| OPTIONAL, -- Need R | |
| sliceCellListNR-r17 | CHOICE { |
| sliceAllowedCellListNR-r17 | SliceCellListNR-r17, |
| sliceExcludedCellListNR-r17 | SliceCellListNR-r17 |
| } | |
| OPTIONAL -- Need R | |
| } | |

TABLE 7-continued

| SliceCellListNR-r17 ::= (SIZE (1..maxCellSlice-r17)) OF PCI-Range | SEQUENCE |
|---|---|

FreqPrioritySlicing field descriptions dl-ImplicitCarrierFreq
Indicates the downlink carrier frequency to which sliceInfoList is
associated with. The frequency is signalled implicitly, value 0
corresponds to the serving frequency, value 1 corresponds to the first
frequency indicated by the InterFreqCarrierFreqList in SIB4, and value 2
coresponds to the second frequency indicated by the
InterFreqCarrierFreqList in SIB4, and so on.

SliceInfo field descriptions nsag-IdentityInfo
This is the NSAG identifier of the NSAG.
sliceAllowedCellListNR
List of allow-listed neighbouring cells for slicing. If present, cells
not listed in this list do not support the corresponding nsag-frequency
pair, according to 38.304 [20], clause 5.2.4.11.
sliceCellListNR
Contains either the list of allow-listed or exclude-listed neighbour
cells for slicing.
sliceExcludedCellListNR
List of exclude-listed neighbouring cells for slicing. If present, cells
not listed in this list support the corresponding slice nsag-frequency
pair, according to 38.304 [20], clause 5.2.4.11.

The UE 1j-01 in the RRC idle mode or the RRC inactive state may perform a cell reselection evaluation when NR frequencies are broadcast by system information indicating that NSAG information provided from a NAS entity is supported, and for which the UE attempts to derive or can derive a cell reselection priority, even when cell reselection priority values (nsag-CellReselectionPriority and/or nsag-CellReselectionSubPriority) for NSAG(s) configured with respect to specific NR frequencies are not explicitly provided from a BS.

The UE 1j-01 performs cell reselection evaluation on NR frequencies and inter-RAT frequencies for which the UE is provided cell reselection priorities via broadcast system information (NR frequencies and inter-RAT frequencies that are given in system information and for which the UE has a priority provided).

The cell reselection evaluation process may indicate a series of processes including reselection priorities handling, performing frequency measurement by applying measurement rules for cell reselection, and evaluating cell reselection criteria and reselecting a cell.

In step 1j-25, the UE 1j-01 in the RRC idle mode or the RRC inactive state may determine a cell reselection priority, based on the system information received in step 1j-20.

In step 1j-30, the UE 1j-01 in the RRC idle mode or the RRC inactive state may perform frequency measurement for cell reselection. To minimize battery consumption, the UE 1j-01 may perform frequency measurement by using the aforementioned measurement rules for cell reselection, according to the cell reselection priority determined in step 1j-25.

In step 1j-35, the UE 1j-01 in the RRC idle mode or the RRC inactive state may determine to reselect a cell fulfilling cell reselection criteria, based on a value of the measurement performed in step 1j-30.

In step 1j-40, the UE 1j-01 in the RRC idle mode or the RRC inactive state receives an MIB or SIB1 broadcast from a candidate target cell before the UE 1j-01 reselects the candidate target cell. When a reception level (Srxlev) and a reception quality (Squal) of the candidate target cell fulfill (Srxlev>0 AND Squal>0) cell selection criterion referred to as S-criterion, the UE 1j-01 may reselect the candidate target cell.

Figure 1K:
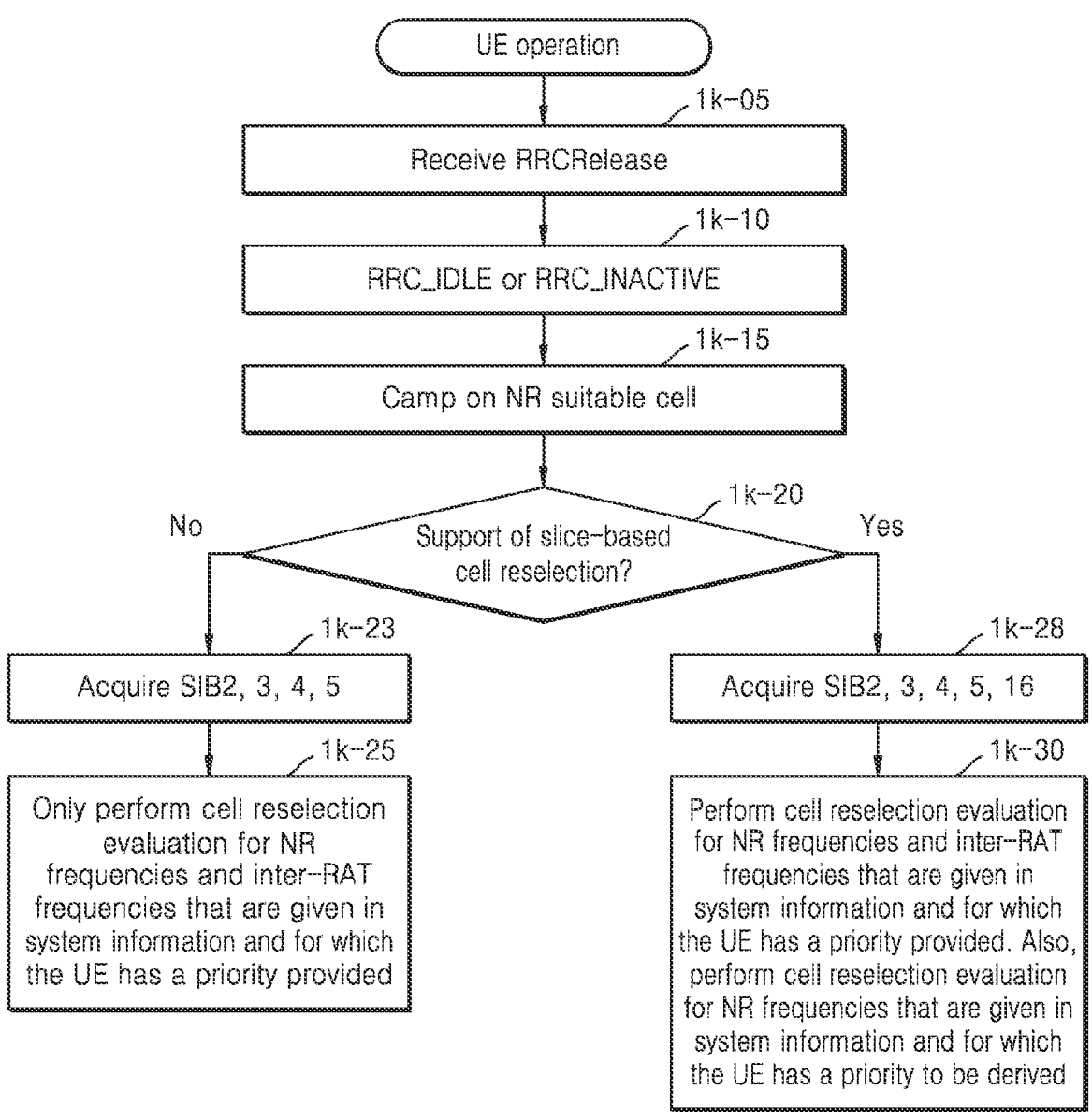
FIG. 1K illustrates that a UE performs a cell reselection evaluation process in a wireless communication system, according to an embodiment.

FIG. 1K illustrates that a UE performs a cell reselection evaluation process in a wireless communication system, according to an embodiment.

Referring to FIG. 1K, in step 1k-05, the UE may receive an RRC connection release message from a BS. The RRC connection release message may include cell reselection priority configuration information (cellReselectionPriorities).

In step 1k-10, the UE may apply the received RRC connection release message and thus may transition to an RRC_IDLE or RRC_INACTIVE mode.

In step 1k-15, the UE may camp on an NR suitable cell.

In step 1k-20, the UE may determine whether a slice-based cell reselection process may be performed by determining whether slice-based cell reselection is supported.

In step 1k-23, if the UE cannot perform the slice-based cell reselection process, the UE may obtain system information (e.g., SIB2/3/4/5) including cell reselection information. In step 1k-25, the UE may perform cell reselection evaluation only on frequencies for which the UE is provided cell reselection priorities from a BS from among NR frequencies and inter-RAT frequencies broadcast from the system information.

In step 1k-28, if the UE can perform the slice-based cell reselection process, the UE may obtain system information (e.g., SIB2/3/4/5/16) including cell reselection information. In step 1k-30, the UE may perform cell reselection evaluation only on frequencies for which the UE is provided cell reselection priorities from a BS from among NR frequencies and inter-RAT frequencies broadcast from the system information. In consideration of NSAG information and NSAG priority information received from a NAS entity, even when cell reselection priority values (nsag-CellReselectionPriority and/or nsag-CellReselectionSubPriority) for NR frequencies supporting the NSAG information are not explicitly provided from the BS, the UE may perform cell reselection evaluation on the NR frequencies for which the UE can derive or attempts to derive a cell reselection priority. That is, even when a cell reselection priority value (nsag-Cell-ReselectionPriority and/or nsag-CellReselectionSubPriority) for an NR frequency supporting NSAG received from an NSAG entity is not explicitly provided from the BS, the UE can derive the NR frequency with a higher cell reselection priority than that of an NR frequency not supporting a slice.

Figure 1L:
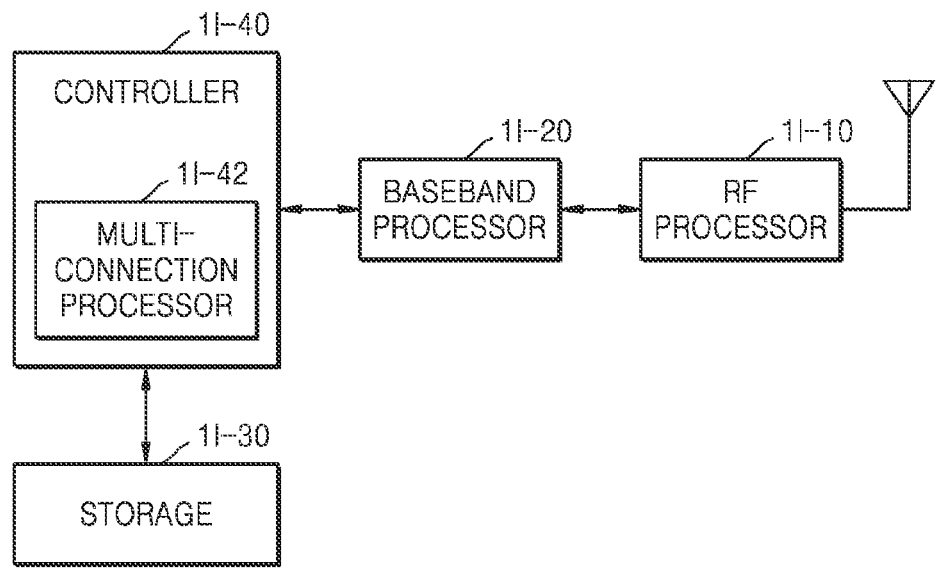
FIG. 1L illustrates a UE according to an embodiment.

FIG. 1L illustrates a block diagram of a UE according to an embodiment of the disclosure.

Referring to FIG. 1L, the UE may include a radio frequency (RF) processor 1*l*-10, a baseband processor 1*l*-20, a storage 1*l*-30, and a controller 1*l*-40.

The RF processor 1*l*-10 may perform functions of transmitting and receiving signals via radio channels, such as band conversion and amplification of the signals. That is, the RF processor 1*l*-10 may up-convert a baseband signal provided from the baseband processor 1*l*-20, into an RF band signal and then may transmit the RF band signal via an antenna and may down-convert an RF band signal received via the antenna, into a baseband signal. For example, the RF processor 1*l*-10 may include a transmission filter, a reception filter, an amplifier, a mixer, an oscillator, a digital-to-analog convertor (DAC), an analog-to-digital convertor (ADC), etc. The UE may include a plurality of antennas. The RF processor 1*l*-10 may include a plurality of RF chains and may perform beamforming. For beamforming, the RF processor 1*l*-10 may respectively adjust phases and intensities of signals to be transmitted or received via a plurality of antennas or antenna elements. The RF processor 1*l*-10 may perform a MIMO operation and may receive a plurality of layers in the MIMO operation.

The baseband processor 1*l*-20 may convert between a baseband signal and a bit string, based on physical entity specifications of a system. For data transmission, the baseband processor 1*l*-20 may generate complex symbols by encoding and modulating a transmission bit string. For data reception, the baseband processor 1*l*-20 may reconstruct a received bit string by demodulating and decoding a baseband signal provided from the RF processor 1*l*-10. For example, when a RAT follows an OFDM scheme, for data transmission, the baseband processor 1*l*-20 may generate complex symbols by encoding and modulating a transmit bit string, may map the complex symbols to subcarriers, and then may configure OFDM symbols by performing inverse fast Fourier transform (IFFT) and cyclic prefix (CP) insertion. For data reception, the baseband processor 1*l*-20 may segment a baseband signal provided from the RF processor 1*l*-10, into OFDM symbol units, may reconstruct signals mapped to subcarriers by performing fast Fourier transform (FFT), and then may reconstruct a received bit string by demodulating and decoding the signals.

The baseband processor 1*l*-20 and the RF processor 1*l*-10 may transmit and receive signals and may be referred to as a transmitter, a receiver, a transceiver, or a communicator. At least one of the baseband processor 1*l*-20 or the RF processor 1*l*-10 may include a plurality of communication modules to support a plurality of different radio access technologies and may include different communication modules to process signals of different frequency bands. For example, the different radio access technologies may include a wireless local area network (LAN) (e.g., IEEE 802.11), a cellular network (e.g., LTE), or the like. The different frequency bands may include a super-high frequency (SHF) band and a millimeter wave (mmWave) (e.g., 60 GHz) band.

The storage 1*l*-30 may store basic programs, application programs, and data, e.g., configuration information, for operations of the UE. The storage 1*l*-30 may provide the stored data upon request by the controller 1*l*-40.

The controller 1*l*-40 controls overall operations of the UE. For example, the controller 1*l*-40 may transmit and receive signals via the baseband processor 1*l*-20 and the RF processor 1*l*-10. The controller 1*l*-40 may record and read data on and from the storage 1*l*-30. To this end, the controller 1*l*-40 may include at least one processor. For example, the controller 1*l*-40 may include a communication processor (CP) for controlling communications and an application processor (AP) for controlling an upper layer such as an application program.

Figure 1M:
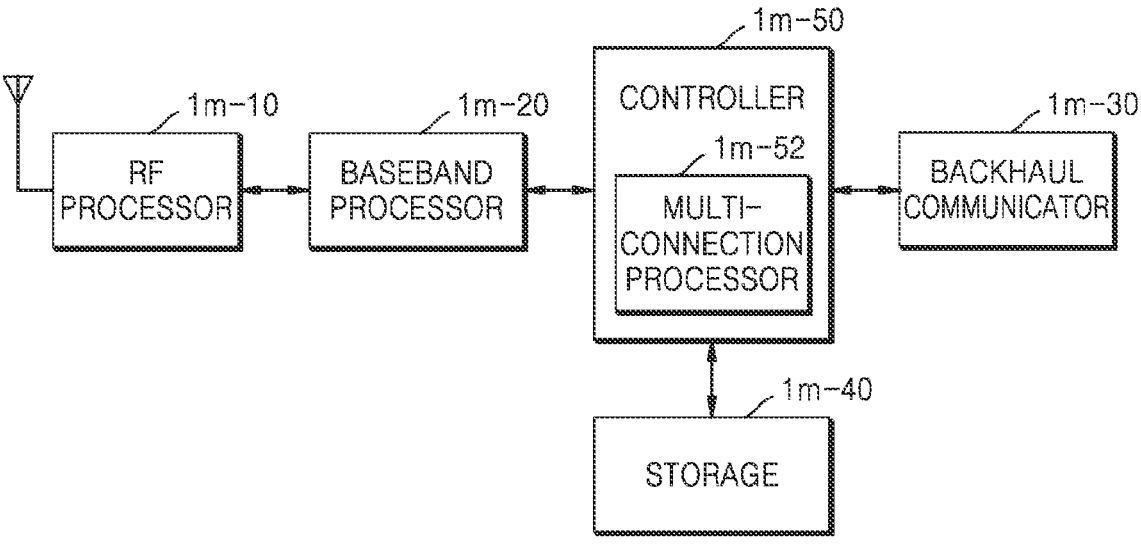
FIG. 1M illustrates an NR BS, according to an embodiment.

FIG. 1M illustrates a block diagram of an NR BS according to an embodiment.

As illustrated in FIG. 1M, the BS may include a RF processor 1*m*-10, a baseband processor 1*m*-20, a backhaul communicator 1*m*-30, a storage 1*m*-40, and a controller 1*m*-50.

The RF processor 1*m*-10 may perform functions of transmitting and receiving signals via radio channels, e.g., band conversion and amplification of the signals. That is, the RF processor 1*m*-10 may up-convert a baseband signal provided from the baseband processor 1*m*-20, into an RF band signal and then may transmit the RF band signal via an antenna and may down-convert an RF band signal received via an antenna, into a baseband signal. For example, the RF processor 1*m*-10 may include a transmission filter, a reception filter, an amplifier, a mixer, an oscillator, a DAC, an ADC, or the like. A first access node may include a plurality of antennas. The RF processor 1*m*-10 may include a plurality of RF chains and may perform beamforming. For beamforming, the RF processor 1*m*-10 may respectively adjust phases and intensities of signals to be transmitted or received via a plurality of antennas or antenna elements. The RF processor 1*m*-10 may perform a DL MIMO operation by transmitting one or more layers.

The baseband processor 1*m*-20 may convert between a baseband signal and a bit string based on physical layer specifications of a RAT. For example, for data transmission, the baseband processor 1*m*-20 may generate complex symbols by encoding and modulating a transmission bit string. For data reception, the baseband processor 1*m*-20 reconstructs a received bit string by demodulating and decoding a baseband signal provided from the RF processor 1*m*-10. For example, when a RAT follows an OFDM scheme, for data transmission, the baseband processor 1*m*-20 may generate complex symbols by encoding and modulating a transmit bit string, may map the complex symbols to subcarriers, and then may configure OFDM symbols by performing IFFT and CP insertion. For data reception, the baseband processor 1*m*-20 may segment a baseband signal provided from the RF processor 1*m*-10, into OFDM symbol units, may reconstruct signals mapped to subcarriers by performing FFT, and then may reconstruct a received bit string by demodulating and decoding the signals. The baseband processor 1*m*-20 and the RF processor 1*m*-10 may transmit and receive signals and may also be referred to as a transmitter, a receiver, a transceiver, a communicator, or a wireless communicator.

The backhaul communicator 1*m*-30 may provide an interface for communicating with other nodes in a network. That is, the backhaul communicator 1*m*-30 may convert a bit string transmitted from a primary BS to an auxiliary BS or a core network, into a physical signal, and may convert a physical signal received from the other node into a bit string.

The storage 1*m*-40 may store basic programs, application programs, and data, e.g., configuration information, for operations of the BS. In particular, the storage 1*m*-40 may store information about bearers allocated for a connected UE and measurement results reported from the connected UE. The storage 1m-40 may store criteria information used to determine whether to provide or release dual connectivity to or from the UE and may provide the stored data upon request by the controller 1m-50.

The controller 1m-50 may control overall operations of the BS. For example, the controller 1m-50 may transmit and receive signals via the baseband processor 1m-20 and the RF processor 1m-10, or the backhaul communicator 1m-30. The controller 1m-50 may record data on the storage 1m-40, and may read data from the storage 1m-40. To this end, the controller 1m-50 may include at least one processor.

The methods according to the embodiments of the disclosure as described in claims or specification may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

The programs may be stored in an attachable storage device accessible via any or a combination of communication networks such as Internet, an intranet, a LAN, a wide LAN (WLAN), a storage area network (SAN), or the like. Such a storage device may access, via an external port, a device performing the embodiments of the disclosure. A separate storage device on the communication network may access the device performing the embodiments of the disclosure.

While the disclosure has been described with reference to various embodiments, various changes may be made without departing from the spirit and the scope of the present disclosure, which is defined, not by the detailed description and embodiments, but by the appended claims and their equivalents.

In accordance with an aspect of the disclosure, a method performed by a UE in a wireless communication system is provided. The method comprises identifying a measurement capability of the UE for a cell reselection. The method comprises receiving, from a base station, an RRC release message including configuration information related to cell reselection priorities based on the measurement capability of the UE. And the configuration information related to the cell reselection priorities comprises a freqPriorityListNR and a freqPriorityListDedicatedSlicing.

In an embodiment of the disclosure, a maximum number of frequencies configured through the freqPriorityListNR and the freqPriorityListDedicatedSlicing is determined based on the measurement capability of the UE.

In an embodiment of the disclosure, in case that a frequency is configured through both the freqPriorityListNR and the freqPriorityListDedicatedSlicing, the frequency is counted once for the maximum number of the frequencies.

In an embodiment of the disclosure, the method further comprises identifying a cell reselection priority value based on the configuration information related to the cell reselection priorities.

In accordance with an aspect of the disclosure, a method performed by a base station in a wireless communication system is provided. The method comprises receiving information related to a measurement capability of the UE for a cell reselection. The method comprises transmitting, to the UE, an RRC release message including configuration information related to cell reselection priorities based on the measurement capability of the UE. And the configuration information related to the cell reselection priorities comprises a freqPriorityListNR and a freqPriorityListDedicatedSlicing.

In accordance with an aspect of the disclosure, a UE of a wireless communication system comprising a transceiver and at least one processor is provided. The at least one processor is configured to identify a measurement capability of the UE for a cell reselection. The at least one processor is configured to receive from a base station, an RRC release message including configuration information related to cell reselection priorities based on the measurement capability of the UE. And the configuration information related to the cell reselection priorities comprises a freqPriorityListNR and a freqPriorityListDedicatedSlicing.

In accordance with an aspect of the disclosure, a base station of a wireless communication system comprising a transceiver and at least one processor is provided. The at least one processor is configured to receive information related to a measurement capability of the UE for a cell reselection. The at least one processor is configured to transmit, to the UE, an RRC release message including configuration information related to cell reselection priorities based on the measurement capability of the UE. And the configuration information related to the cell reselection priorities comprises a freqPriorityListNR and a freqPriorityListDedicatedSlicing.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) in a wireless communication system, the method comprising:
   identifying a measurement capability of the UE for a cell reselection; and
   receiving, from a base station, a radio resource control (RRC) release message including configuration information related to cell reselection priorities,
   wherein the configuration information related to the cell reselection priorities comprises a frequency priority list new radio (freqPriorityListNR) and a freqPriorityListDedicatedSlicing, and
   wherein in case that a frequency is configured in both the freqPriorityListNR and freaPriorityListDedicatedSlicing, the frequency is counted once.

2. The method of claim 1, wherein a maximum number of frequencies is configured up to eight through the freqPriorityListNR and the freqPriorityListDedicatedSlicing.

3. The method of claim 2, wherein the maximum number of the frequencies is determined based on the measurement capability of the UE.

4. The method of claim 1, wherein the method further comprises:

identifying a cell reselection priority value based on the configuration information related to the cell reselection priorities.

5. A method performed by a base station in a wireless communication system, the method comprising:

receiving information related to a measurement capability of a user equipment (UE) for a cell reselection; and transmitting, to the UE, a radio resource control (RRC) release message including configuration information related to cell reselection priorities based on the measurement capability of the UE, wherein the configuration information related to the cell reselection priorities comprises a frequency priority list new radio (freqPriorityListNR) and a freqPriorityListDedicatedSlicing, and wherein in case that a frequency is configured in both the freqPriorityListNR and freqPriorityListDedicatedSlicing, the frequency is counted once.

6. The method of claim 5, wherein a maximum number of frequencies is configured up to eight through the freqPriorityListNR and the freqPriorityListDedicatedSlicing.

7. The method of claim 6, wherein the maximum number of the frequencies is determined based on the measurement capability of the UE.

8. The method of claim 5, wherein a cell reselection priority value is identified based on the configuration information related to the cell reselection priorities.

9. A user equipment (UE) of a wireless communication system, the UE comprising:

a transceiver; and at least one processor configured to:

identify a measurement capability of the UE for a cell reselection, and receive, from a base station, a radio resource control (RRC) release message including configuration information related to cell reselection priorities based on the measurement capability of the UE, wherein the configuration information related to the cell reselection priorities comprises a frequency priority list new radio (freqPriorityListNR) and a freqPriorityListDedicatedSlicing, and wherein in case that a frequency is configured in both the freqPriorityListNR and freqPriorityListDedicatedSlicing, the frequency is counted once.

10. The UE of claim 9, wherein a maximum number of frequencies is configured up to eight through the freqPriorityListNR and the freqPriorityListDedicatedSlicing.

11. The UE of claim 10, wherein the maximum number of the frequencies is determined based on the measurement capability of the UE.

12. The UE of claim 9, wherein the at least one processor further configured to:

identify a cell reselection priority value based on the configuration information related to the cell reselection priorities.

13. A base station of a wireless communication system, the UE comprising:

a transceiver; and at least one processor configured to:

receive information related to a measurement capability of a user equipment (UE) for a cell reselection, and transmit, to the UE, a radio resource control (RRC) release message including configuration information related to cell reselection priorities based on the measurement capability of the UE, wherein the configuration information related to the cell reselection priorities comprises a frequency priority list new radio (freqPriorityListNR) and a freqPriorityListDedicatedSlicing, and wherein in case that a frequency is configured in both the freqPriorityListNR and freaPriorityListDedicatedSlicing, the frequency is counted once.

14. The base station of claim 13, wherein a maximum number of frequencies is configured up to eight through the freqPriorityListNR and the freqPriorityListDedicatedSlicing.

15. The base station of claim 14, wherein the maximum number of the frequencies is determined based on the measurement capability of the UE.

16. The base station of claim 13, wherein a cell reselection priority value is identified based on the configuration information related to the cell reselection priorities.

* * * * *